(12) United States Patent
Klots

(10) Patent No.: US 8,989,910 B1
(45) Date of Patent: Mar. 24, 2015

(54) SYSTEMS AND METHODS FOR DATA MINING OF ENERGY CONSUMPTION DATA

(75) Inventor: Boris Klots, Belmont, CA (US)

(73) Assignee: C3, Inc., Redwood City, CA (US)

( * ) Notice: Subject to any disclaimer, the term of this patent is extended or adjusted under 35 U.S.C. 154(b) by 421 days.

(21) Appl. No.: 13/341,014

(22) Filed: Dec. 30, 2011

Related U.S. Application Data

(60) Provisional application No. 61/429,000, filed on Dec. 31, 2010.

(51) Int. Cl.
*G06F 17/18* (2006.01)

(52) U.S. Cl.
USPC .......................................... 700/291; 702/179

(58) Field of Classification Search
CPC ................................ G06Q 50/06; G01R 21/00
USPC .............. 700/286, 291, 295; 702/60, 61, 179, 702/181; 713/340
See application file for complete search history.

(56) References Cited

U.S. PATENT DOCUMENTS

| | | | | |
|---|---|---|---|---|
| 6,816,078 B2 * | 11/2004 | Onoda et al. | ................... | 340/658 |
| 6,816,811 B2 * | 11/2004 | Seem | ............................ | 702/179 |
| 7,395,250 B1 * | 7/2008 | Aggarwal et al. | ............... | 706/20 |
| 7,472,099 B2 * | 12/2008 | Nishiuma et al. | ............... | 706/45 |
| 7,743,086 B2 * | 6/2010 | Hu et al. | ....................... | 709/200 |
| 7,865,456 B2 * | 1/2011 | Aggarwal et al. | ............... | 706/45 |
| 7,869,647 B2 * | 1/2011 | Li | ................................. | 382/159 |
| 7,877,621 B2 * | 1/2011 | Jacoby et al. | ................. | 713/340 |
| 7,958,064 B2 * | 6/2011 | Zhu et al. | ........................ | 706/12 |
| 7,987,106 B1 * | 7/2011 | Aykin | ........................... | 705/7.11 |
| 8,089,368 B2 * | 1/2012 | Hong et al. | ................ | 340/636.1 |
| 8,156,055 B2 * | 4/2012 | Shimada et al. | ................. | 706/12 |
| 8,321,188 B2 * | 11/2012 | Johnson et al. | .................... | 703/6 |
| 8,332,945 B2 * | 12/2012 | Kim et al. | ........................ | 726/24 |
| 8,423,194 B2 * | 4/2013 | Besore et al. | ................. | 700/286 |
| 8,532,839 B2 * | 9/2013 | Drees et al. | .................... | 700/305 |
| 8,538,484 B2 * | 9/2013 | Chan et al. | ...................... | 455/566 |
| 8,589,112 B2 * | 11/2013 | Tsypin et al. | ................. | 702/130 |
| 8,606,419 B2 * | 12/2013 | Besore et al. | ................. | 700/291 |
| 8,756,024 B2 * | 6/2014 | Hedley et al. | .................. | 702/60 |
| 2002/0010754 A1 * | 1/2002 | Brown | ......................... | 709/217 |
| 2002/0138492 A1 * | 9/2002 | Kil | ................................. | 707/100 |
| 2002/0191024 A1 * | 12/2002 | Huneycutt | .................... | 345/772 |
| 2003/0028350 A1 * | 2/2003 | Seem | .......................... | 702/179 |
| 2003/0055677 A1 * | 3/2003 | Brown et al. | ..................... | 705/1 |
| 2003/0101009 A1 * | 5/2003 | Seem | .............................. | 702/61 |
| 2005/0091176 A1 * | 4/2005 | Nishiuma et al. | ............... | 706/45 |
| 2005/0114103 A1 * | 5/2005 | Han et al. | .......................... | 703/2 |
| 2005/0226495 A1 * | 10/2005 | Li | ................................. | 382/159 |
| 2006/0116830 A1 * | 6/2006 | Shan | ............................... | 702/60 |
| 2008/0021652 A1 * | 1/2008 | Schneider et al. | ................ | 702/3 |
| 2008/0147852 A1 * | 6/2008 | Zhu et al. | ....................... | 709/224 |
| 2008/0276111 A1 * | 11/2008 | Jacoby et al. | ................. | 713/340 |
| 2010/0191487 A1 * | 7/2010 | Rada et al. | ...................... | 702/60 |
| 2010/0280978 A1 * | 11/2010 | Shimada et al. | ................. | 706/12 |
| 2010/0313270 A1 * | 12/2010 | Kim et al. | ........................ | 726/24 |
| 2011/0040990 A1 * | 2/2011 | Chan et al. | ...................... | 713/300 |
| 2011/0061015 A1 * | 3/2011 | Drees et al. | .................... | 715/771 |
| 2011/0119042 A1 * | 5/2011 | Johnson et al. | .................... | 703/6 |
| 2011/0160927 A1 * | 6/2011 | Wilson et al. | ................. | 700/291 |
| 2011/0282504 A1 * | 11/2011 | Besore et al. | ................. | 700/291 |

* cited by examiner

*Primary Examiner* — Charles Kasenge
(74) *Attorney, Agent, or Firm* — Sheppard Mullin Richter & Hampton LLP

(57) ABSTRACT

Methods, machine-readable media, apparatuses and systems are provided to collect and analyze data relating to energy consumption and factors affecting energy production. In various embodiments, such analysis can include time series analysis, multivariate correlation analysis, cluster analysis, anomaly detection methods, multi-dimensional density analysis and demand modeling.

165 Claims, 21 Drawing Sheets

|  | KWh | P.F. | Prodlev | HDD | Wkday? | Weekend? |
|---|---|---|---|---|---|---|
| KWh | 1.0000 | 0.6949 | 0.8661 | -0.1644 | 0.8720 | -0.8581 |
| P.F. | 0.6949 | 1.0000 | 0.3793 | 0.0683 | 0.4518 | -0.4516 |
| Prodlev | 0.8661 | 0.3793 | 1.0000 | -0.2224 | 0.9591 | -0.9429 |
| HDD | -0.1644 | 0.0683 | -0.2224 | 1.0000 | -0.0611 | 0.0446 |
| Wkday? | 0.8720 | 0.4518 | 0.9591 | -0.0611 | 1.0000 | -0.9835 |
| Weekend? | -0.8581 | -0.4516 | -0.9429 | 0.0446 | -0.9835 | 1.0000 |
| There are 1 missing values. The correlations are estimated by REML method. | | | | | | |

SYSTEMS AND METHODS FOR DATA MINING OF ENERGY CONSUMPTION DATA

RELATED APPLICATIONS

This application claims the benefit of U.S. Provisional Application No. 61/429,000, filed Dec. 31, 2010, entitled "SYSTEMS AND METHODS FOR DATA MINING OF ENERGY CONSUMPTION DATA", the disclosure of which is incorporated herein by reference in its entirety.

FIELD

At least some embodiments of the disclosure relate generally to the field of analysis of energy consumption, usage and demand data and, more particularly but not limited to, finding energy demand consumption patterns and anomalies, and correlating these patterns and anomalies with, among other things, production levels and ambient temperature.

BACKGROUND

Large enterprises typically consume significant amounts of energy. Energy and emissions produced by such enterprises are influenced by a large number of factors, among other things, production levels, temperature, working shifts, idle time, weekends, holidays, repair periods, seasons, and so forth.

BRIEF DESCRIPTION OF THE DRAWINGS

These and other features, aspects, and advantages will become better understood with regard to the following description, appended claims, and accompanying drawings where:

DETAILED DESCRIPTION

Figure 1:
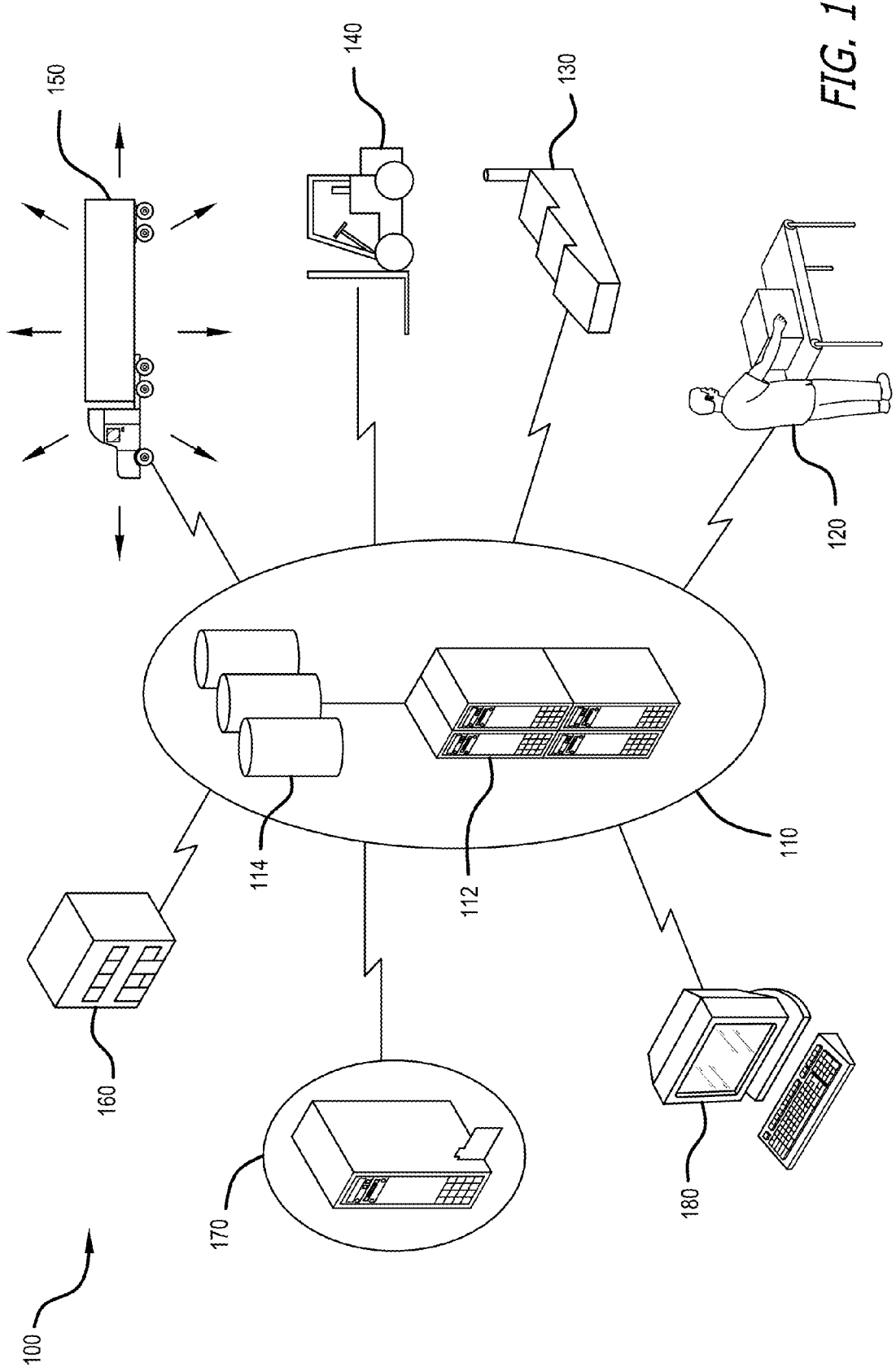
FIG. 1 is an illustration of one type of environment in which one or more embodiments of the disclosed systems and methods could be used.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" or "some embodiments" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Features of embodiments that are herein expressly or impliedly described as one of methods, machine-readable media, apparatuses, or systems should be understood to also describe the other of methods, machine-readable media, apparatuses, or systems. For example, embodiments describing features of an apparatus or system should be understood to also describe a method involving the features and a machine-readable media involving the features.

Mining data relating to energy consumption patterns, production levels, ambient temperature and other factors potentially influencing energy consumption can help an enterprise identify patterns in energy consumption, usage and demand, and factors that are most significant in influencing such consumption patterns. In one embodiment, the disclosed systems and methods comprise data mining techniques for the analysis of energy consumption. In one embodiment, major energy consumption patterns are identified and correlated with the production levels and ambient temperature, and potential inefficiencies in the production processes can be identified and eliminated.

In one embodiment, the disclosed data mining techniques can be applied with minimal upfront knowledge of actual technological processes affecting energy consumption. In one embodiment, a method groups energy consumption data into dense clusters. These clusters can then be interpreted as manifestations of separate business processes (or distinct phases of business processes). In one embodiment, the cases that significantly deviate from common patterns represented by the clusters can be identified allowing analysis of business anomalies and inefficiencies.

In one embodiment, the disclosed data mining techniques build granular models of energy consumption for each cluster and compares these models across, for example different time periods, locations, production levels, and weather conditions, which can then be used for identifying and eliminating inefficiencies, setting realistic corporate standards and benchmarks and providing realistic forecasting of energy demands and emissions.

FIG. 1 is an illustration of one type of environment in which one or more embodiments of the disclosed systems and methods could be used.

An enterprise maintains one or more energy consumption analysis servers 112 at a central location 110. The energy consumption analysis servers 112 collect energy consumption data from a variety of sources internal to the organization. For example, energy consumption data could be collected for assembly lines 120, entire manufacturing points 130, warehousing operations 140, distribution networks 150, and offices 160. The energy consumption data could be collected at varying degrees of granularity. For example, in the case of an office, energy consumption data could be collected for an entire building, for a floor in a building, or individual offices. The data can be collected at different geographic locations, and various enterprises comprising the company.

In one embodiment, energy consumption analysis servers 112 additionally collect data relating to factors that affect energy consumption. As used herein, energy consumption generally refers to various terms and metrics including but not limited to usage, demand, load, power factor, and so forth. As used herein, factors that affect energy consumption should be broadly understood to encompass any kind of known or measurable variable reflecting a physical or temporal condition that has the potential to affect energy consumption. Such data could include, without limitation, data relating to ambient temperature, production levels, working shifts, idle time, weekends, holidays, repair periods, seasons, and so forth. Such data could be collected from any of the sources 120-160 for energy consumption data cited above. Such data could also be collected from one or more external data sources 170, such as, for example, websites providing data relating to weather or temperature.

In one embodiment, the energy consumption analysis servers 112 store energy consumption data and data relating to factors affecting energy consumption in one or more databases or data stores or file systems 114 for analysis on a real-time, near-time or historical basis. In one embodiment, the energy consumption analysis servers 112 analyze energy consumption data and data relating to factors affecting energy consumption stored in the databases 114, as described below, on a periodic or continuous basis. In one embodiment, the results of such analysis can be provided to employees or agents of the enterprise via terminals or display stations 180 or as reports.

Figure 2:
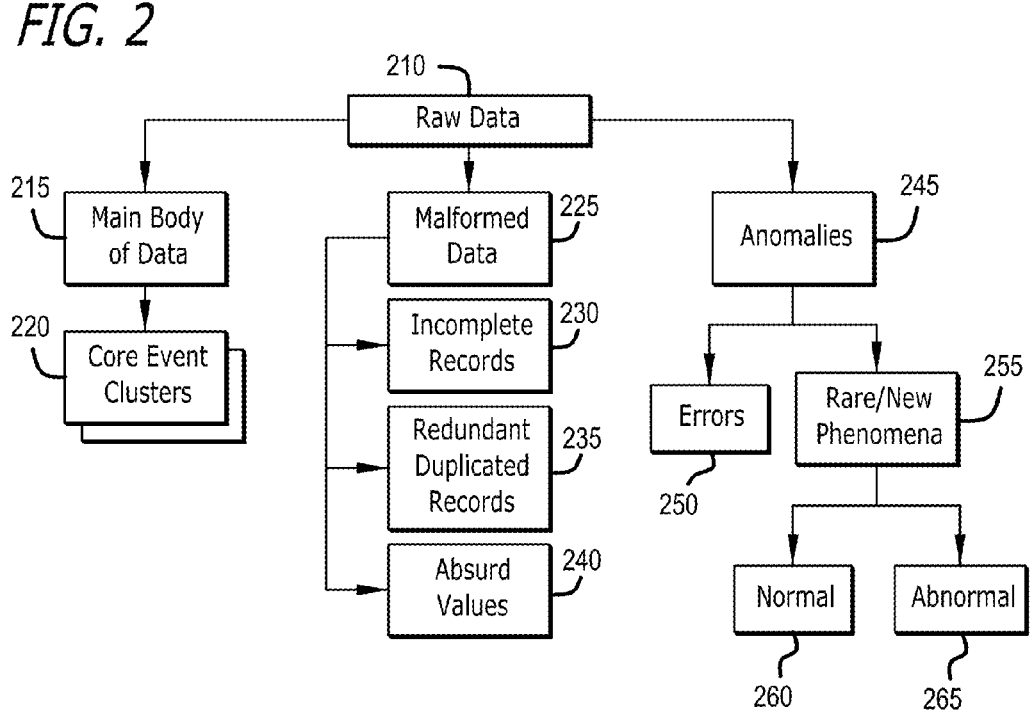
FIG. 2 is an illustration of the types and quality of energy consumption data that can be obtained from the data sources described above.

FIG. 2 is an illustration of the types and quality of energy consumption data that can be obtained from the data sources described above according to one embodiment. In one embodiment, raw energy consumption data 210 comprises three basic categories of data. The main body of the data 215 includes clusters of data relating to core events 220. In one embodiment, core events include events that recur on a regular basis within an enterprise that significantly affect energy consumption. For example, core events could include manufacturing shifts at a production facility. Raw energy consumption data 210 can additionally include various types of erroneous data 225-240 that can be ignored. Such data includes malformed data 225, incomplete data records 230, redundant and/or duplicate data records 235 and absurd values 240.

Raw energy consumption data 210 can additionally include various types of data relating to genuine anomalies 245, such as unexplained peaks or troughs in energy consumption. Such data could relate to errors 250 produced by, for example, errors in data collection. Such data could relate to rare or new phenomenon 255, which could be normal 260 explainable periodic occurrences, such as a peak in manufacturing due to an unusual peak in orders. Such data could relate to abnormal situations 265, such as malfunctioning equipment.

Figure 3:
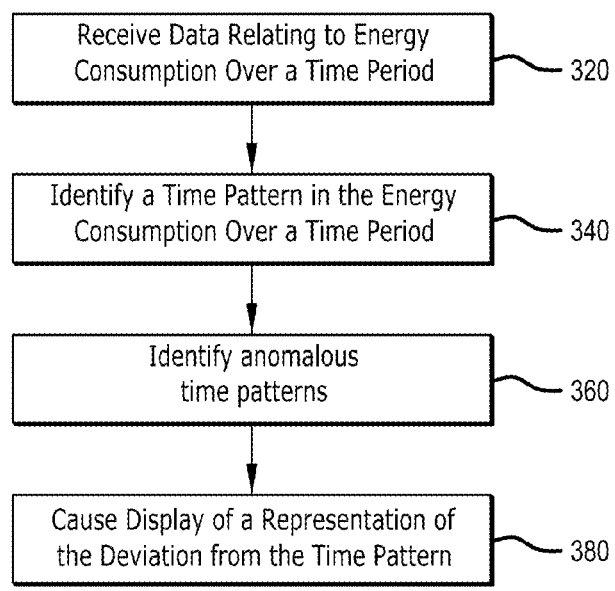
FIG. 3 is an illustration of a one method of analyzing energy consumption data using time series analysis.

FIG. 3 is an illustration of one method 300 of analyzing energy consumption data using time series analysis according to one embodiment. In block 320 of the method, data relating to energy consumption for a time period is collected. As noted above, the data relating to energy consumption could originate from multiple sources. As noted above, energy consumption data could be collected at any level of granularity, for example, at the level of a location, a plant, a floor or a specific assembly line.

In block 340 of the method, data relating to energy consumption for a time period is analyzed to identify a time pattern in the energy consumption over a time period. In one embodiment, time pattern analysis can comprise any mathematical techniques suitable for identifying patterns in a series of values. Such techniques could include fast Fourier transformation and integral wavelet transformation techniques.

In block 360 of the method, deviations in time patterns in energy consumption over the time period are identified. Techniques that could be used are discussed in detail below. In block 380 of the method, a deviation in the time pattern in the energy consumption over the time period is displayed to a user.

Figure 4:
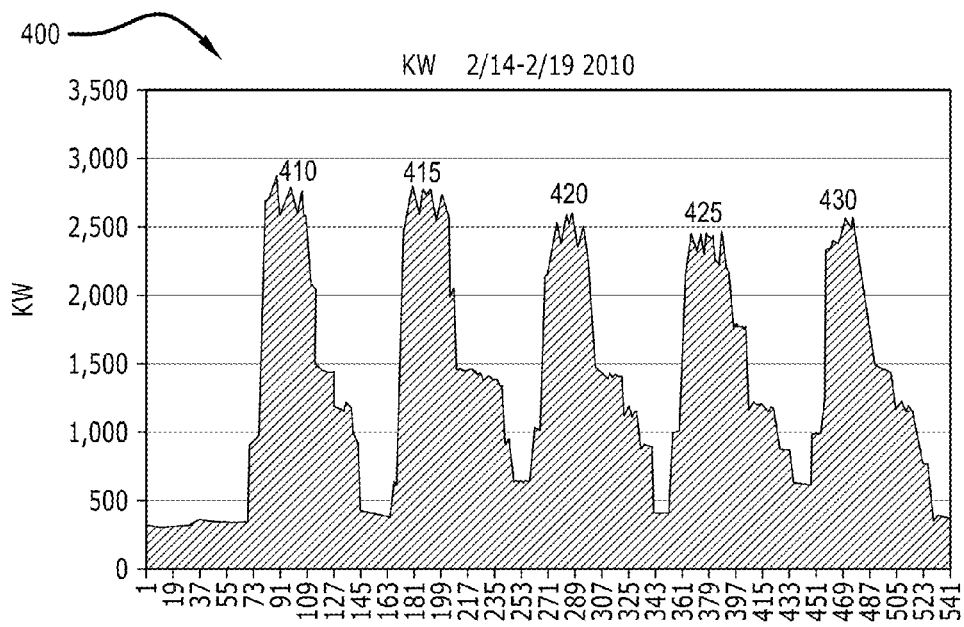
FIG. 4 provides an example of how energy consumption patterns could vary on a periodic basis for a manufacturing facility.

FIG. 4 provides an example 400 of how energy consumption patterns could vary on a periodic basis for a manufacturing facility according to one embodiment. The illustrated time series analysis shows five daily peaks 410-430 in energy consumption. This pattern could represent normal energy consumption patterns related to, for example, daily production shifts. Where stable energy consumption patterns can be identified, it may suggest opportunities to improve production efficiency. In one embodiment, time patterns such as shown in FIG. 4 can be identified using Fast Fourier Transformation.

Figure 5:
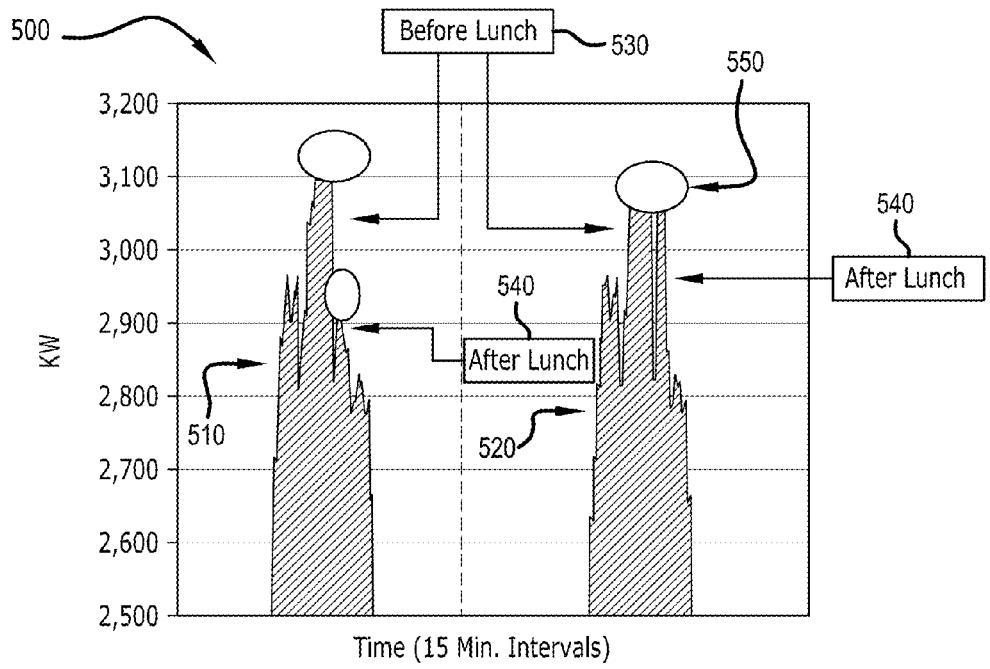
FIG. 5 shows an example of how the analysis of time series of energy consumption data could be used to enhance the efficiency of production at a manufacturing facility.

FIG. 5 shows an example 500 of how the analysis of time series of energy consumption data could be used to enhance the efficiency of production at a manufacturing facility according to one embodiment. The time series 510 shows energy consumption in 15-minute intervals for an actual peak consumption day. Relative to consumption before lunch hours 530, there is a noticeable drop in consumption after lunch hours 540. If it is possible to move approximately 60 KW of energy consumption from pre-lunch to post lunch hours by altering a production schedule for the facility. such as shown in time series 520 for a proposed production schedule, peak consumption 550 can be shaved off by 1.54%. By making energy consumption more uniform and decreasing peak consumption, it may be possible to reduce the overall cost of energy.

Figure 6:
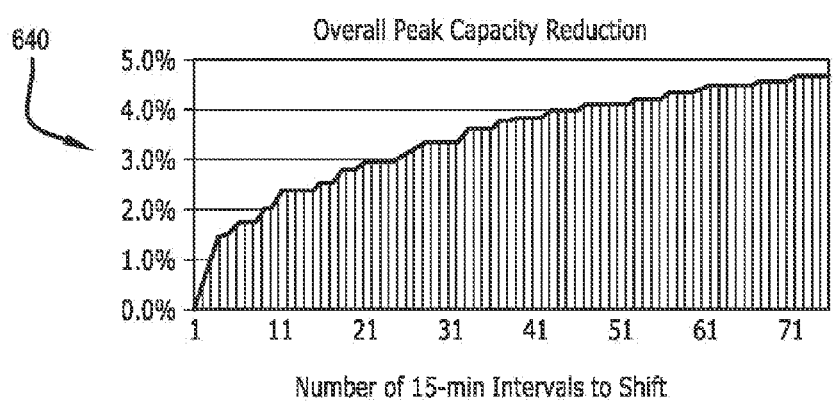
FIG. 6 shows how rearranging intervals over days may impact peak capacity.

FIG. 6 shows how rearranging energy consumption for ten 15-minute intervals over four days will shave off 2.37% of peak capacity as shown in table 620 according to one embodiment. In the illustrated example, for the date of February 9 632, energy consumption for six time intervals has been shifted according to the proposed production schedule shown in 520 of FIG. 5. Energy consumption for four additional time intervals for three additional days 622-624 have also been shifted. In the illustrated example, diminishing returns are achieved as 4.5% reduction in peak capacity is approached with respect to approximately 70 intervals, as shown in graph 640. More savings might be obtained if it is possible to rearrange consumption across working shifts.

Figure 7:
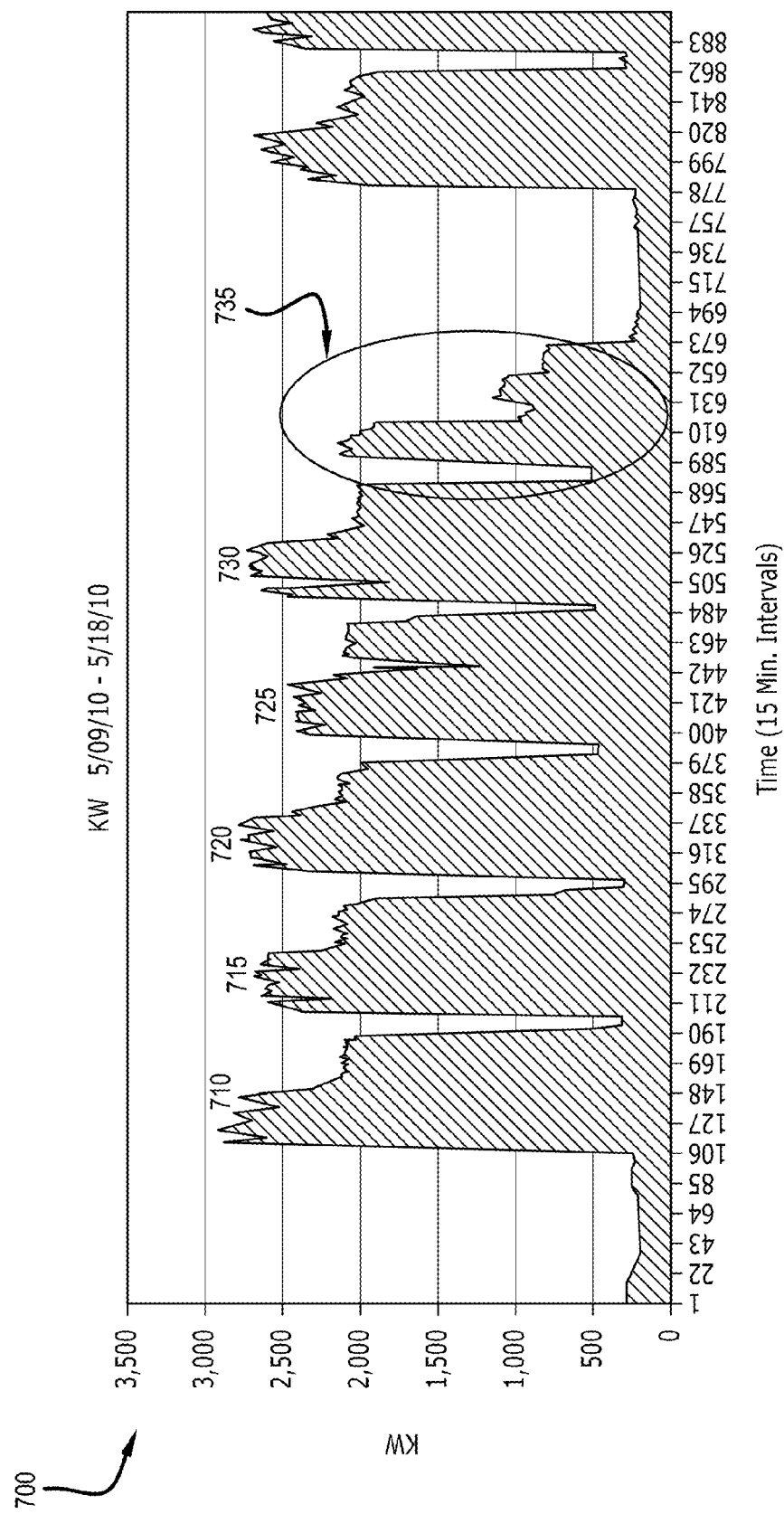
FIG. 7 shows an example of how the analysis of time series of energy consumption data could be used to identify anomalous conditions.

FIG. 7 shows an example of how the analysis of time series of energy consumption data could be used to identify anomalous conditions according to one embodiment. FIG. 7 provides an example 700 of energy consumption patterns for the same manufacturing facility shown in FIG. 4. The illustrated time series analysis shows five daily peaks 710-730 in energy consumption which follow a predictable pattern. A sixth peak 735, however, illustrates an anomalous pattern where energy consumption generally follows the hourly variation seen in the five daily peaks 710-730, but is unusually low. This anomalous pattern could represent a daily production shift that was unusually low in volume, or could reflect malfunctioning manufacturing or measurement equipment. In various embodiments, distribution sampling analysis or information theory based techniques (e.g. Kullback Leibler divergence) can be used to identify the deviations from the time pattern. In one embodiment, peaks in the time patterns in energy consumption can be algorithmically smoothed.

Figure 8:
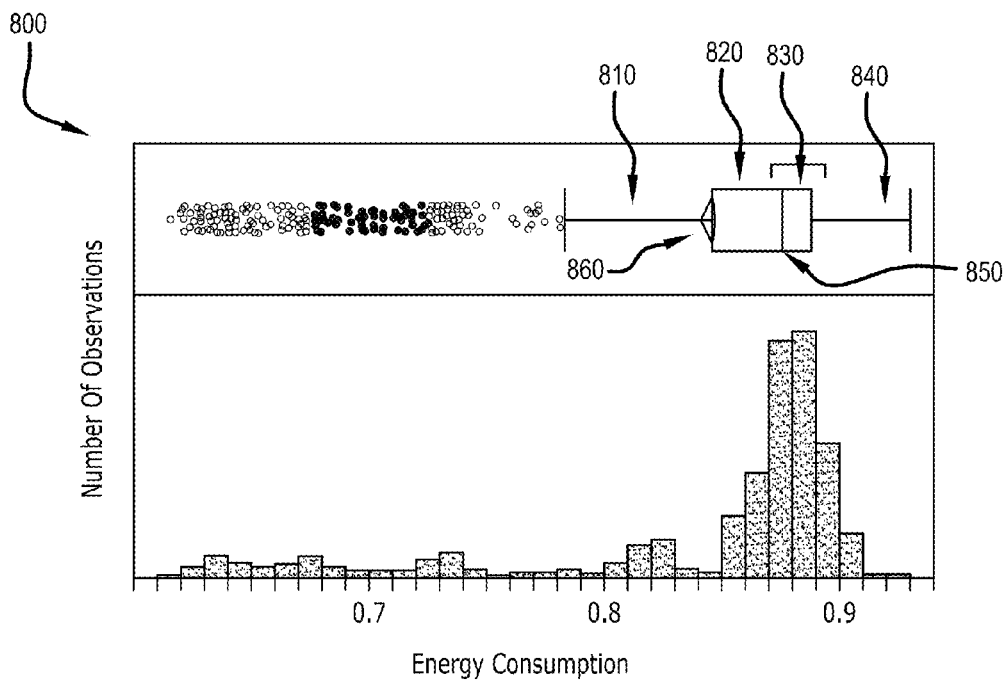
FIG. 8 shows an example of how energy consumption data can be used to construct a Tukey box plot.

In one embodiment, energy consumption data can be used to construct a Tukey box plot 800, such as shown in FIG. 8. The boxplot can be used for initial energy consumption outlier detection. In the illustrated embodiment, the plot follows standard well-known algorithms: full range of energy consumption data is used, including outliers. The time series is grouped into 4 quartiles: Q1 ... Q4, representing the lowest 25% 810, the next 25% 820, the next 25% 830, and the highest 25% 840. The central set of observations is represented as boxes for Q2 820, Q3 830, and the median is the boundary 850 between them. The middle 50% is boxed 820 and 830 and the mean is shown as a diamond 860. The width of the range is 95% confidence interval of the mean. The spread of the data is the interquartile range (the width of the box)=third quartile−first quartile. The whiskers are 1.5× interquartile range from box boundaries, and outliers are within the ranges outside of the whiskers. White, outlined dots outside the whiskers represent potential outliers, while the black dots are the regular observation.

Figure 9:
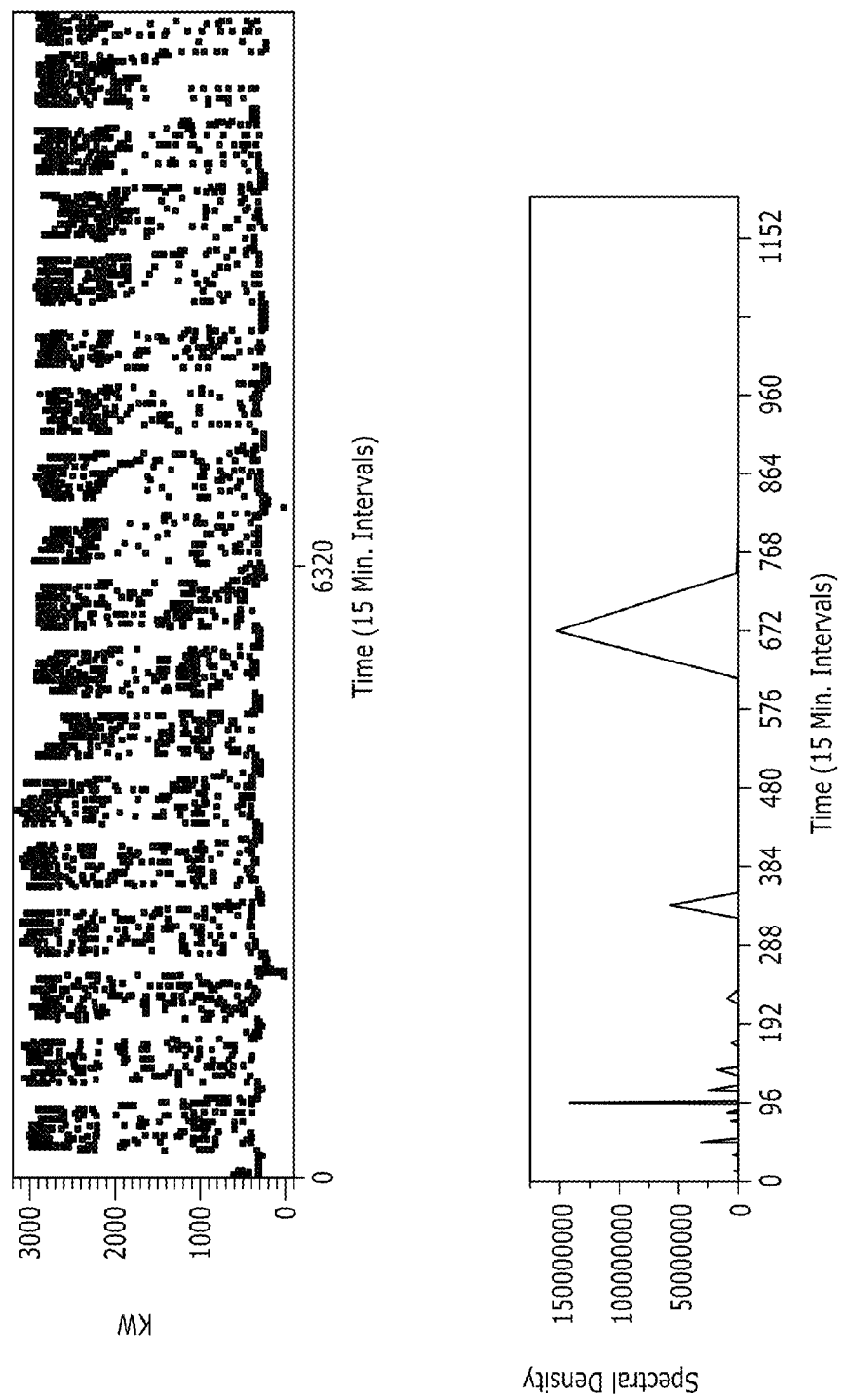
FIG. 9 shows an example of how energy consumption data in a time series can be approximated using spectral analysis.
Figures 10, 11:
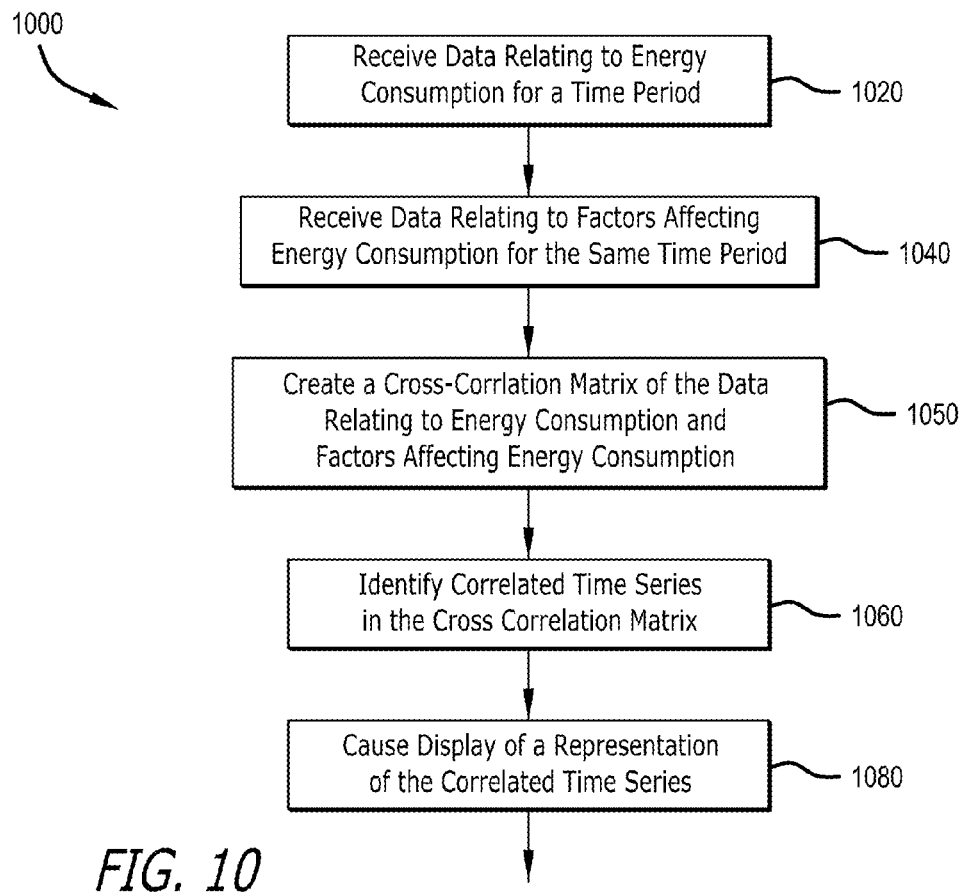
FIG. 10 is an illustration of one method of analyzing energy consumption data using multivariate analysis.
FIG. 11 is an example of a multivariate correlation matrix.

In one embodiment, a time series can be approximated using spectral analysis, such as shown in FIG. 9. In one embodiment, when data is approximated by combinations of its most significant frequencies a 100-fold reduction in data storage requirements can be achieved.

Where data relating to factors that affect energy consumption is available, multivariate analysis can be applied to energy consumption data to yield additional insight. FIG. 10 is an illustration of one method 1000 of analyzing energy consumption data using such multivariate analysis according to one embodiment. In block 1020 of the method, data relating to energy consumption for a time period is received. As noted above, the data relating to energy consumption could originate from multiple sources. As noted above, energy consumption data could be collected at any level of granularity, for example, at the level of a location, a plant, a floor or a specific assembly line.

In block 1040 of the method, data relating to one or more factors that potentially affects energy consumption is received for the same time period. Such factors could include, for example, production levels or ambient temperature. In one embodiment, the data relating to factors affecting energy consumption could originate from multiple sources. In one embodiment, the data relating to factors affecting energy consumption could be collected at any level of granularity, for example, at different time granularities, at the level of a location, a plant, a floor or a specific assembly line.

In block 1050 of the method, a cross-correlation matrix (or/and a matrix of associations) of the data relating to energy consumption and factors affecting energy consumption is created. In block 1060 of the method, significantly correlated time series are identified in the cross correlation matrix. In block 1080 of the method, a representation of the significantly correlated time series is then caused to be displayed, for example, to a user.

In one embodiment, a cross-correlation matrix may be formed by a combination of related time series forming a multidimensional vector as shown in FIG. 11. In the illustrated example, the dimension of the multidimensional vector is six, including KWh (consumption), production levels, heating days (HDD), day of the week and power factor (PF).

The correlation matrix allows users to identify groups of factors influencing the target metrics. In the illustrated embodiment a multi dimensional model is created, for example, for KWh (energy consumption), using factors such as: production levels, and day of the week. In the illustrated embodiment, correlation with HDD is very low; therefore, HDD is not included in the model.

Figure 12:
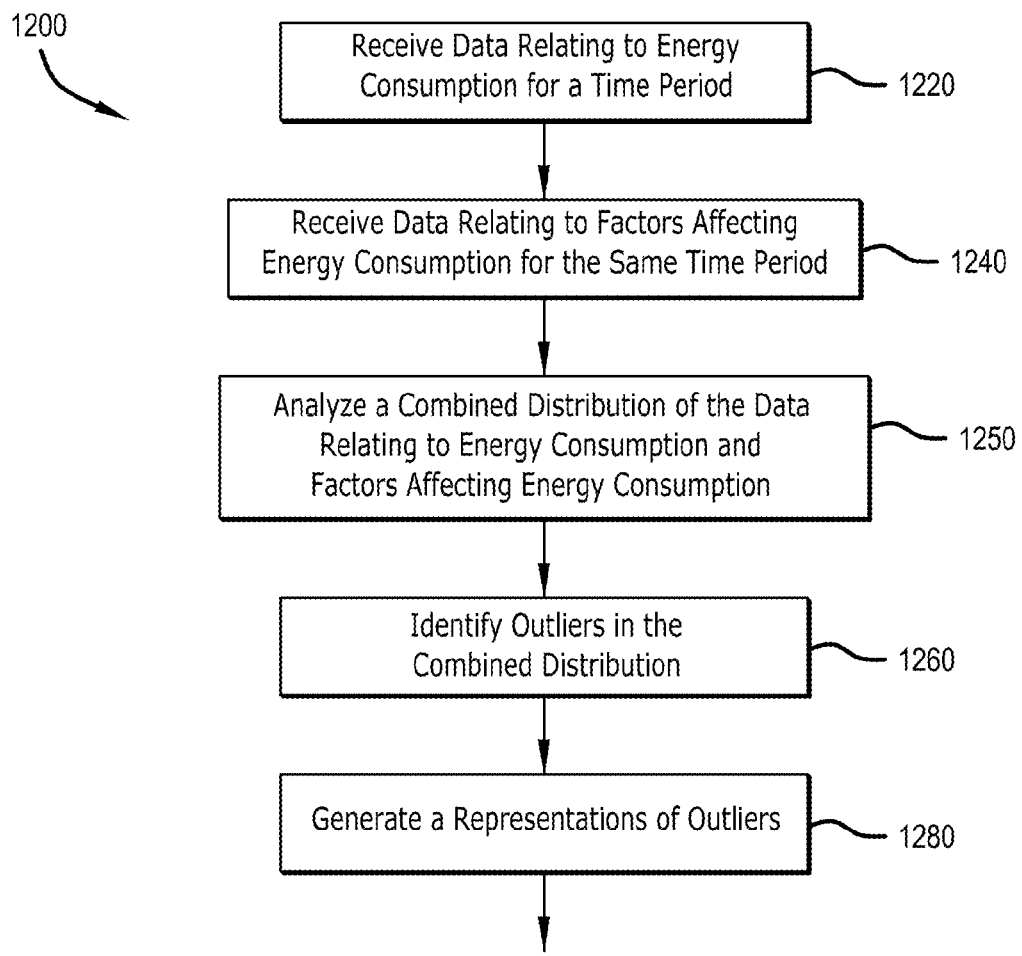
FIG. 12 is an illustration of another method of analyzing energy consumption data using multivariate analysis.

FIG. 12 is an illustration of another method 1200 of analyzing energy consumption data using multivariate analysis according to one embodiment. In block 1220 of the method, data relating to energy consumption for a time period is received. As noted above, the data relating to energy consumption could originate from multiple sources. As noted above, energy consumption data could be collected at any level of granularity, for example, at the level of a location, a plant, a floor or a specific assembly line.

In block 1240 of the method, data relating to one or more factors that potentially affects energy consumption is received for the same time period. As noted above, such factors could include, for example, production levels or ambient temperature. As noted above, in one embodiment, the data relating to factors affecting energy consumption could originate from multiple sources. As noted above, in one embodiment, the data relating to factors affecting energy consumption could be collected at any level of granularity, for example, at different time granularities, at the level of a location, a plant, a floor or a specific assembly line.

In block 1250 of the method, a combined distribution of the data relating to energy consumption and the data relating factors affecting energy consumption is analyzed, and outliers are identified 1260 in the combined distribution. In block 1280 of the method, a representation of the outlier is then caused to be displayed, for example, to a user.

Figure 13:
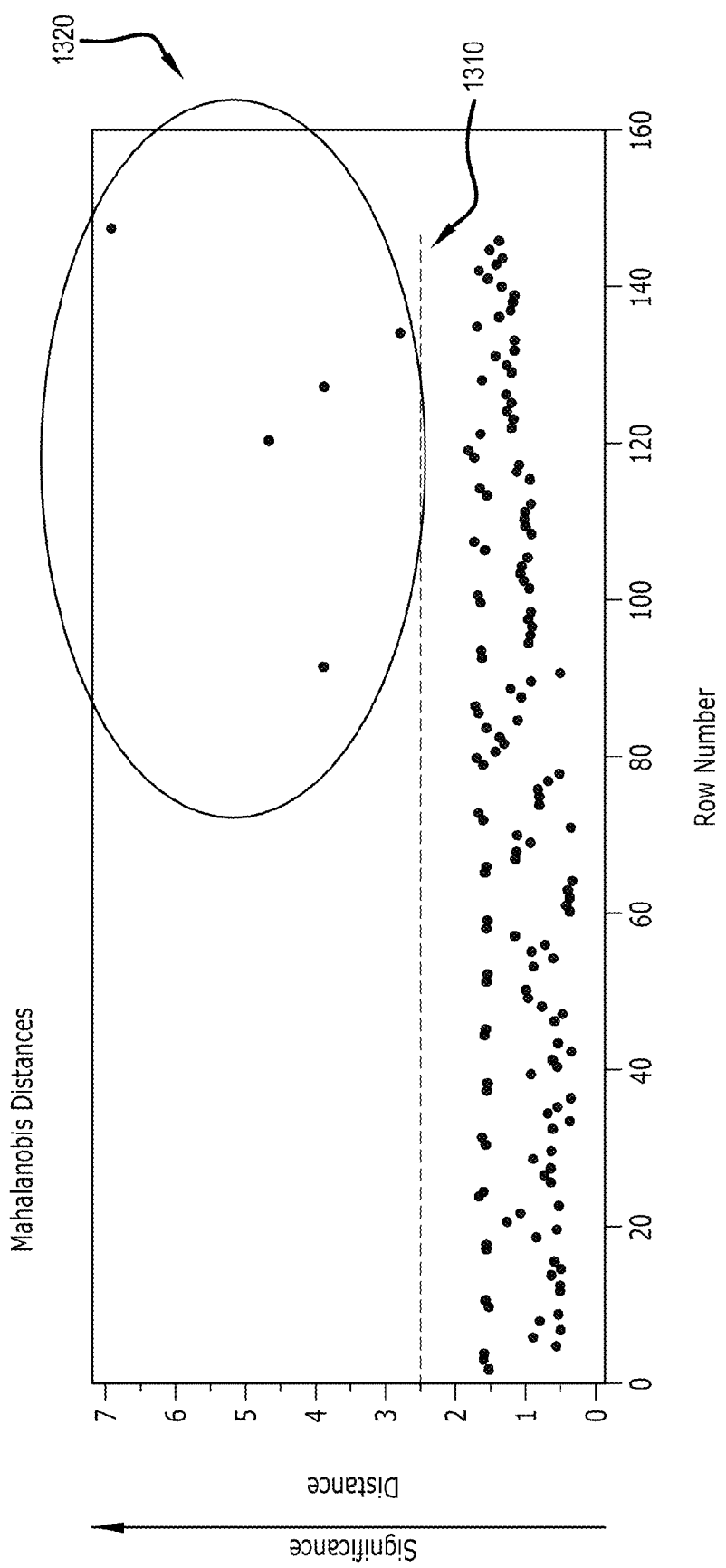
FIG. 13 is an illustration of identifying outliers using Mahalanobis distance analysis.

In one embodiment, outliers can be identified using Mahalanobis distance analysis as illustrated in FIG. 13 that measures the likelihood of belonging to the distribution that generated a cluster. Among other things, the Mahalanobis distance analysis measures the distance to a centroid of the data based on an inverse to a covariance matrix, for example, according to the equation $$D(X) = \sqrt{(X_i - \overline{X})^T S^{-1}(X_i - \overline{X})}.$$

In another interpretation of distance, the dotted line 1310 as shown is a 95% confidence interval Outliers 1320 are clearly visible.

Figure 14:
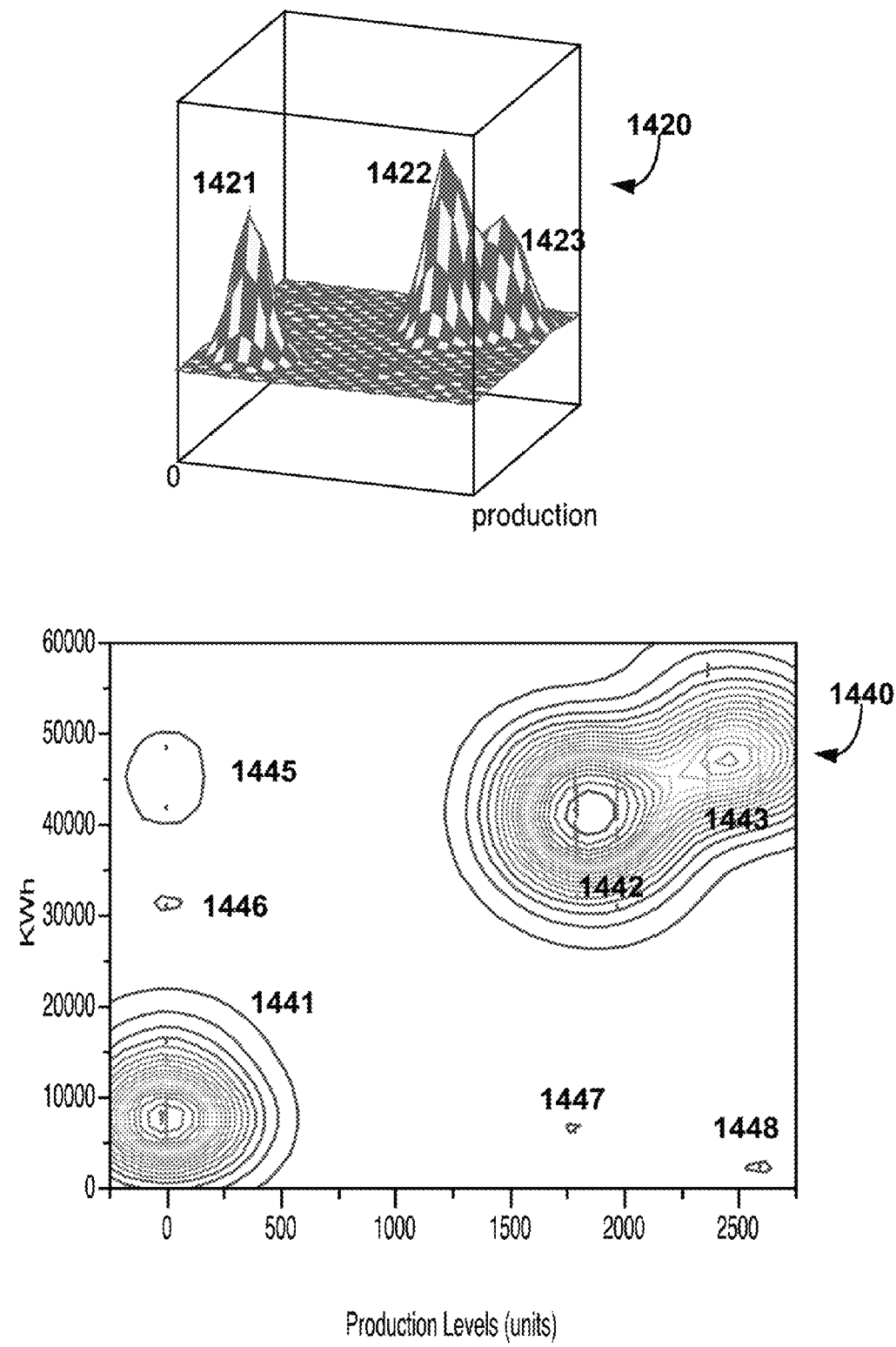
FIG. 14 illustrates one embodiment of using non-parametric density analysis of daily consumption (KWh) vs. production levels.

In one embodiment, data relating to energy consumption and factors that potentially affect energy consumption can be analyzed using non-parametric density analysis such as, for example, Kernel density estimation or K-nearest neighbor estimation. FIG. 14 illustrates one embodiment of using non-parametric density of daily consumption (KWh) vs. production levels. The data clusters can be represented, for example, as peaks in a topographic map 1420 and/or a heat map 1440. As can be readily seen, there are three distinct peaks 1421, 1422, and 1423 in the topographic map 1420, and three distinct clusters 1441, 1442, and 1443 in the heat map 1440.

Referring specifically to the heat map 1440, in one embodiment, the lowest cluster 1442 could represent a normal production shift that runs well below peak capacity, such as, for example, a weekend shift. The middle cluster 1442 could represent a time period (e.g., January through March) where a normal production shift (e.g., a weekday shift) is running somewhat below peak capacity. The highest cluster 1443 could represent a time period (e.g., April to May) where a normal production shift (e.g., a weekday shift) is running at or near peak capacity.

In one embodiment, the outliers 1445-1448 represent various types of abnormal data values. The outliers 1445 and 1446 may represent days where the energy consumption is abnormally high for the production level. Such outliers could be caused by problems in the underlying data. More importantly, however, such outliers could represent situations where a production line is consuming an excessive amount of energy for the production levels attained, for example, due to equipment or electrical problems or mismanagement of production facilities. The outliers 1447 and 1448 may represent days where it appears the energy consumption is abnormally low for the production level. Such outliers are most likely caused by problems in the underlying data.

Figure 15:
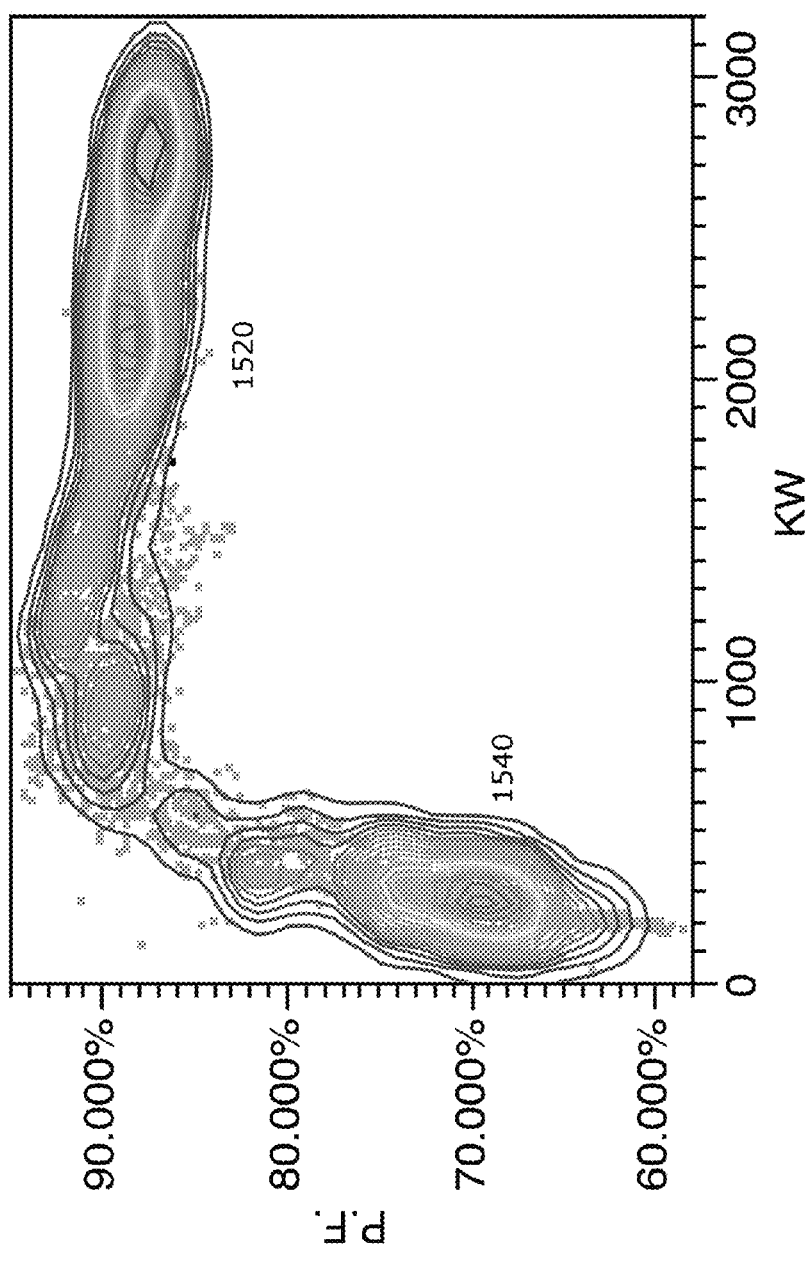
FIG. 15 illustrates an example of the application of non-parametric density analysis to an exemplary set of data relating to power factor (PF) and energy consumption KW.

FIG. 15 illustrates an example of the application of non-parametric density analysis to an exemplary set of data, in this case relating to power factor (PF) and energy consumption KW according to one embodiment. Two clearly distinct clusters are seen: (1) a cluster with high KW (>800) where the power factor is almost constant 1520, and (2) a cluster with low KW (<800) and relatively low power factors 1540. These clusters could represent two underlying, distinct physical/production processes.

Figure 16:
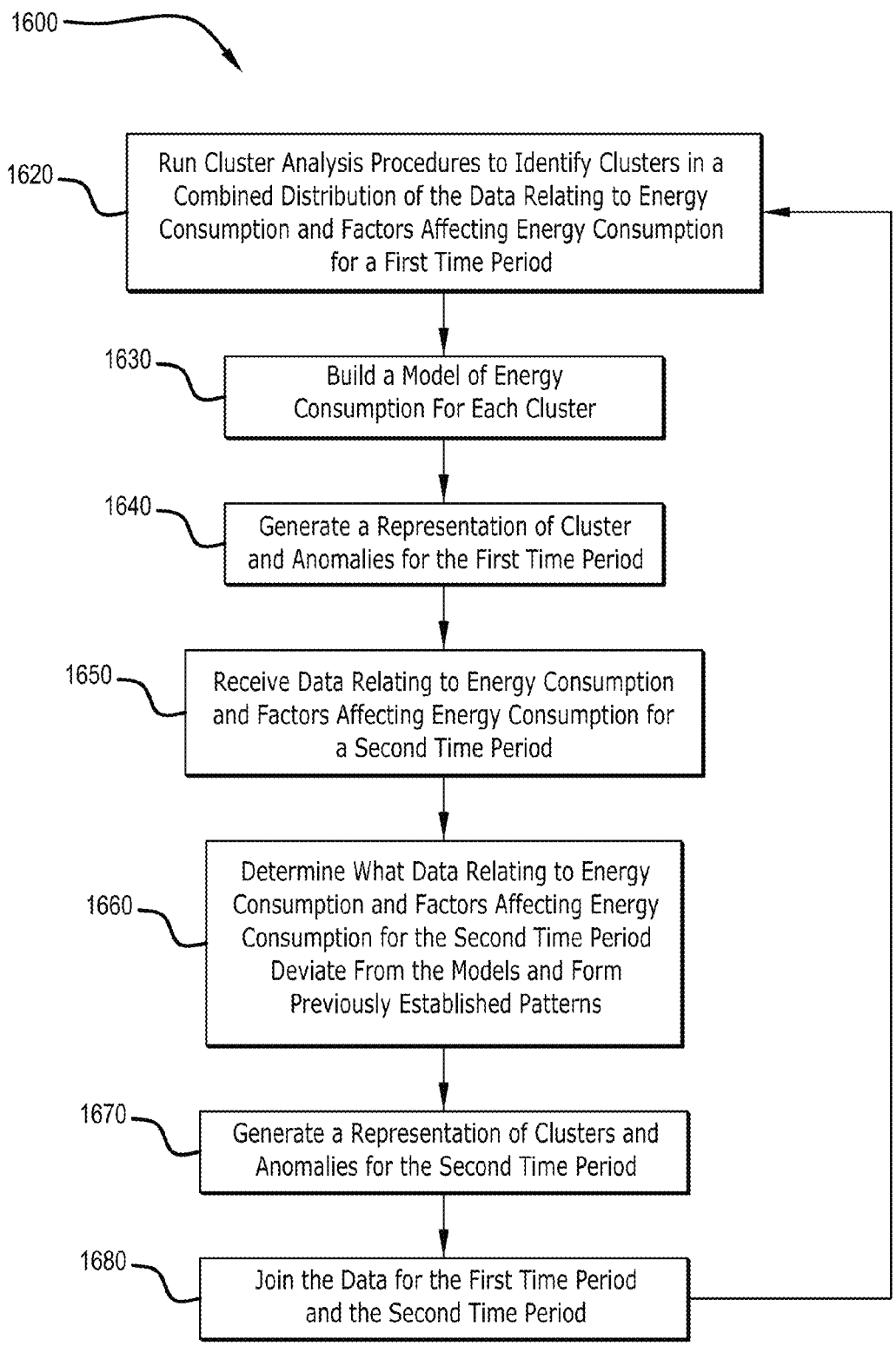
FIG. 16 is an illustration of one method for using the results of non-parametric density analysis to model energy consumption.

As shown above, using non-parametric density analysis for identifying clusters in historical data can be used to identify outliers in such data. Additionally, such clusters can be used to create models of energy consumption patterns that can be used to detect anomalous energy consumption patterns on an ongoing basis. FIG. 16 is an illustration of one method 1600 using such techniques according to one embodiment.

In block 1620 of the method, one or more cluster analysis procedures are run to identify clusters in a combined distribution of the data relating to energy consumption and factors affecting energy consumption for a first time period. In one embodiment, the clusters are identified using Mahalanobis distance or non-parametric density analysis techniques such as those discussed above with reference to FIGS. 14 and 15. In block 1630 of the method, one or more models of energy consumption are built for each cluster. In various embodiments, the model could be any set of data, equations and/or parameters capable of representing the data cluster. Another embodiment is to build a metric that for each new observation numerically represents a similarity (or distance) to the observations comprising this cluster. In block 1640 of the method, a representation of clusters and anomalies for the first time period is then generated.

In block 1650 of the method, data is then received relating to energy consumption and factors affecting energy consumption for a second time period. In one embodiment, the data is received on a real-time or near-time basis. The data could represent data from the same physical location whose data was used to identify the data cluster underlying the model of energy consumption. Alternatively, the data could represent data from an entirely different physical location. In block 1660 of the method, it is then determined what data relating to energy consumption and factors affecting energy consumption for the second time period conforms with previously established patterns and what data deviates from the models. In block 1670 of the method, a representation of clusters and anomalies for the second time period is then generated.

In block 1680 of the method, the data for the first time period and the second period are merged and the process can loop back to block 1620 of the method.

Figure 17:
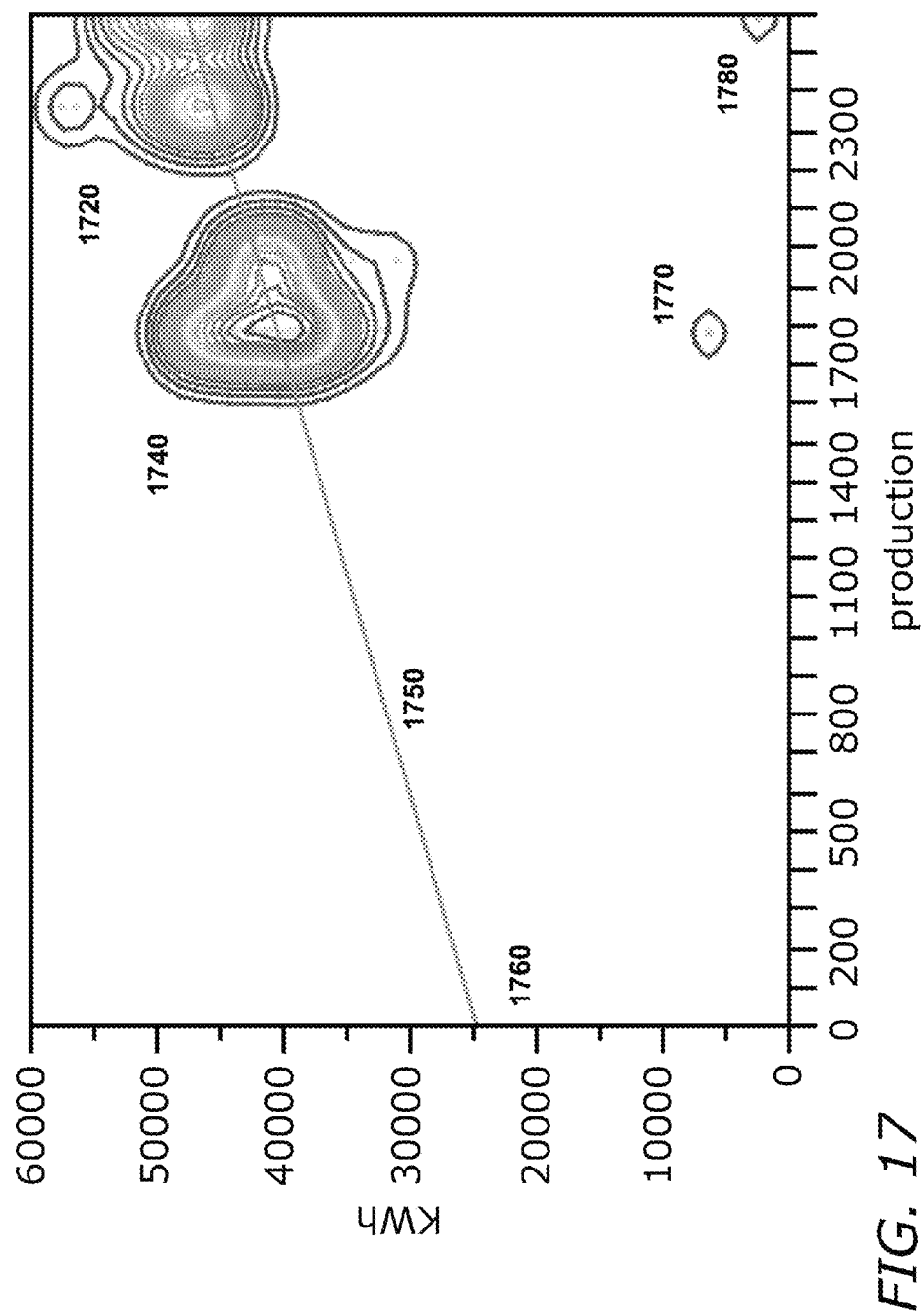
FIG. 17 illustrates an example of a marginal demand model based on regression analysis for an exemplary set of data relating to production and energy consumption KW.

One type of model of energy consumption based on clusters is a marginal consumption model. FIG. 17 illustrates one such model according to one embodiment. Two clearly distinct density clusters 1720 and 1740 relating to production and energy consumption (KWh) are visible in the data. The lower cluster 1740 could represent a time period (e.g., January through March) where a weekday production shift is running somewhat below peak capacity. The higher cluster 1720 could represent a time period (e.g., April to May) where a weekday production shift is running at or near peak capacity.

Assuming energy consumption varies linearly with the production level, a marginal consumption model is built. A number of outliers 1770 and 1780, representing apparently abnormally low energy consumption for the level of production, are seen well below the line 1750 and intercept 1760. In this case, these data points most likely reflect errors in the data collection process.

Figure 18:
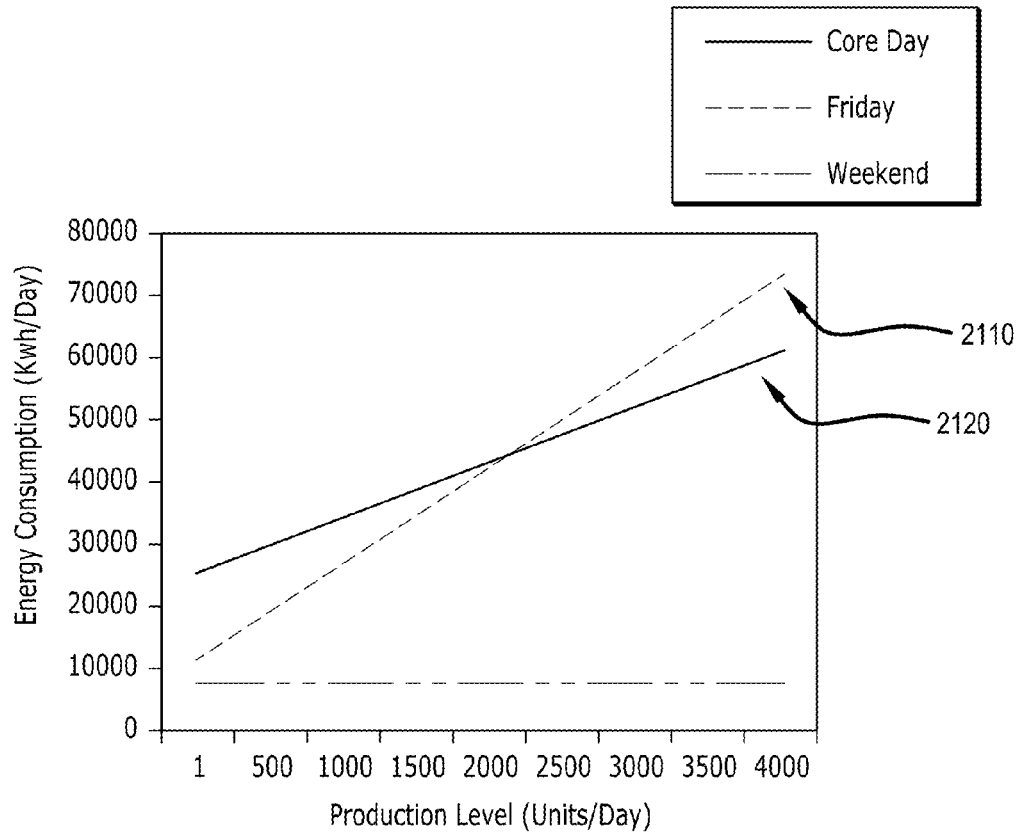
FIG. 18 illustrates one embodiment of energy consumption models per cluster similar to models shown in FIG. 17.

FIG. 18 illustrates one embodiment of a comparison of the results shown in FIG. 17. Such an analysis can provide the basis for more robust energy consumption planning. Once one or more marginal consumption models are identified, a statistical estimate of future energy consumption as a function of production volumes can be derived. In the illustrated embodiment, marginal energy consumption on Fridays as shown by line 1810 appears high. The intercept for core days as shown by line 1820 appears high compared to weekends. These observations could reflect an underlying problem with production on Fridays or core days, or could merely reflect a data issue or a small sample issue. Further analysis of more data may be merited.

Figure 19:
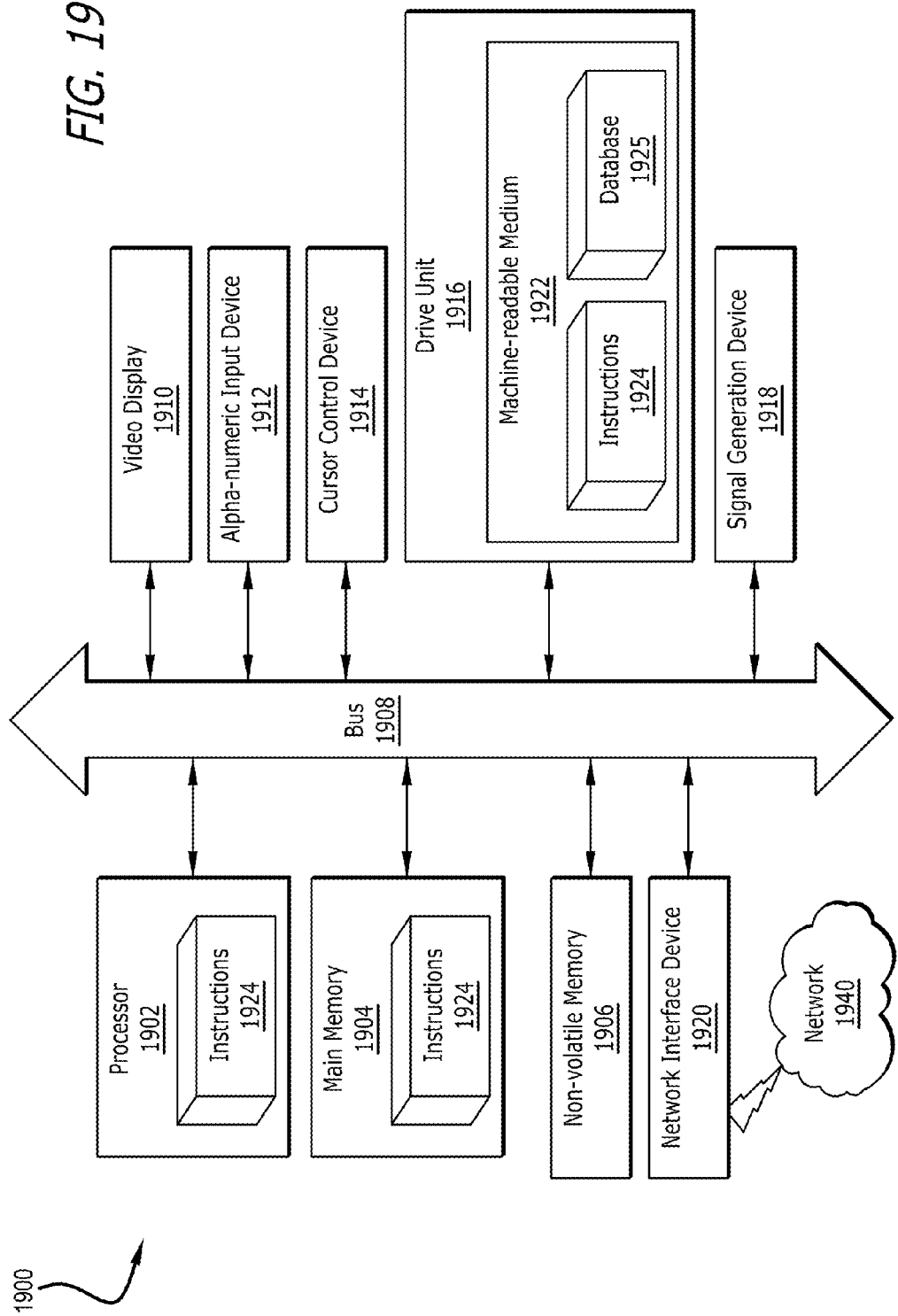
FIG. 19 is a diagrammatic representation of an embodiment of a machine within which a set of instructions for causing the machine to perform one or more of the methodologies discussed herein may be executed.

FIG. 19 is a diagrammatic representation of an embodiment of a machine 1900, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

In one embodiment, the machine 1900 may be an energy consumption analysis server such as the energy consumption analysis server 112 of FIG. 1. In one embodiment, the machine 1900 may be a component of an energy consumption analysis server 112, such as one or more computers within a network of energy consumption analysis servers 112. In one embodiment, the machine 1900 may be the terminals or display stations 180 of FIG. 1.

The machine 1900 includes a processor 1902 (e.g., a central processing unit (CPU) a graphics processing unit (GPU) or both), a main memory 1904 and a nonvolatile memory 1906, which communicate with each other via a bus 1908. In some embodiments, the machine 1900 may be a desktop computer, a laptop computer, personal digital assistant (PDA) or mobile phone, for example. In one embodiment, the machine 1900 also includes a video display 1910, an alpha-numeric input device 1912 (e.g., a keyboard), a cursor control device 1914 (e.g., a mouse), a drive unit 1916, a signal generation device 1918 (e.g., a speaker) and a network interface device 1920.

In one embodiment, the video display 1910 includes a touch sensitive screen for user input. In one embodiment, the touch sensitive screen is used instead of a keyboard and mouse. The disk drive unit 1916 includes a machine-readable medium 1922 on which is stored one or more sets of instructions 1924 (e.g., software) embodying any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also including machine-readable media. The instructions 1924 may further be transmitted or received over a network 1940 via the network interface device 1920. In some embodiments, the machine-readable medium 1922 also includes a database 1925.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

In general, the routines executed to implement the embodiments of the disclosure, may be implemented as part of an operating system or a specific application, component, program, object, module or sequence of instructions referred to as "programs." For example, one or more programs may be used to execute specific processes described herein. The programs typically comprise one or more instructions set at various times in various memory and storage devices in the machine, and that, when read and executed by one or more processors, cause the machine to perform operations to execute elements involving the various aspects of the disclosure.

Moreover, while embodiments have been described in the context of fully machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

An Illustrative Use Case

The following presents an illustrative use case of an embodiment of the systems and methods disclosed herein which is intended to exemplary, and not limiting. The example covers a highly computerized company with multiple automatic meters installed at all facilities. Meters produce readings of production characteristics, granular metrics of energy (and other resource) consumption. The data is stored in databases and analyzed on a regular basis. A single data meter produces about hundred of data points per day, so the annual volume of data to be processed over multiple plants is counted in multiple millions of data points.

For the purposes of the present use case, approximately 100,000 data points containing 15-minute meter readings were gathered Two energy cost drivers were evaluated: peak demand management and overall energy consumption, especially during idle periods (weekends and night drops), with a particular focus on identifying low cost, non-disruptive improvement measures. Granular (15 minute) meter readings provide ample material for accurate statistical analysis, although measurement periods longer or shorter that 15 minutes could be used.

Figure 20:
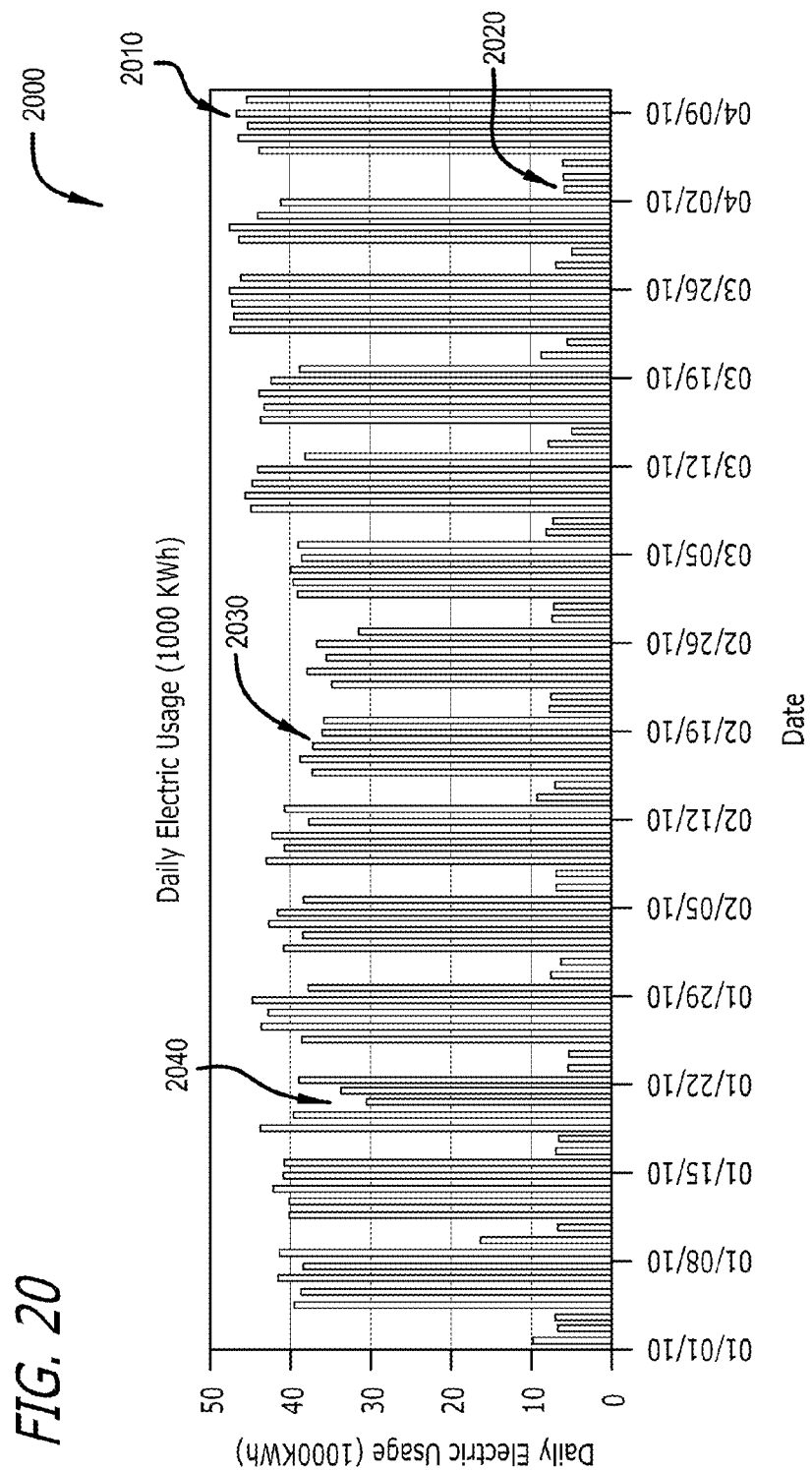
FIG. 20 illustrates an example of a plot of aggregated daily meter readings from a manufacturing plant.

FIG. 20 shows a plot 2000 of aggregated daily meter readings from January to May of 2010 produced using an embodiment of the present disclosure. The data reveals a relatively regular weekly pattern revealing, for example, higher electric usage on weekdays 2010 and lower electric usage on weekends 2020. Additionally, electric usage varies from week to week to a smaller extent, for example, compare 2010 and 2030. Electric usage also periodically exhibits significant intraweek variation, for example, see 2040.

Figure 21:
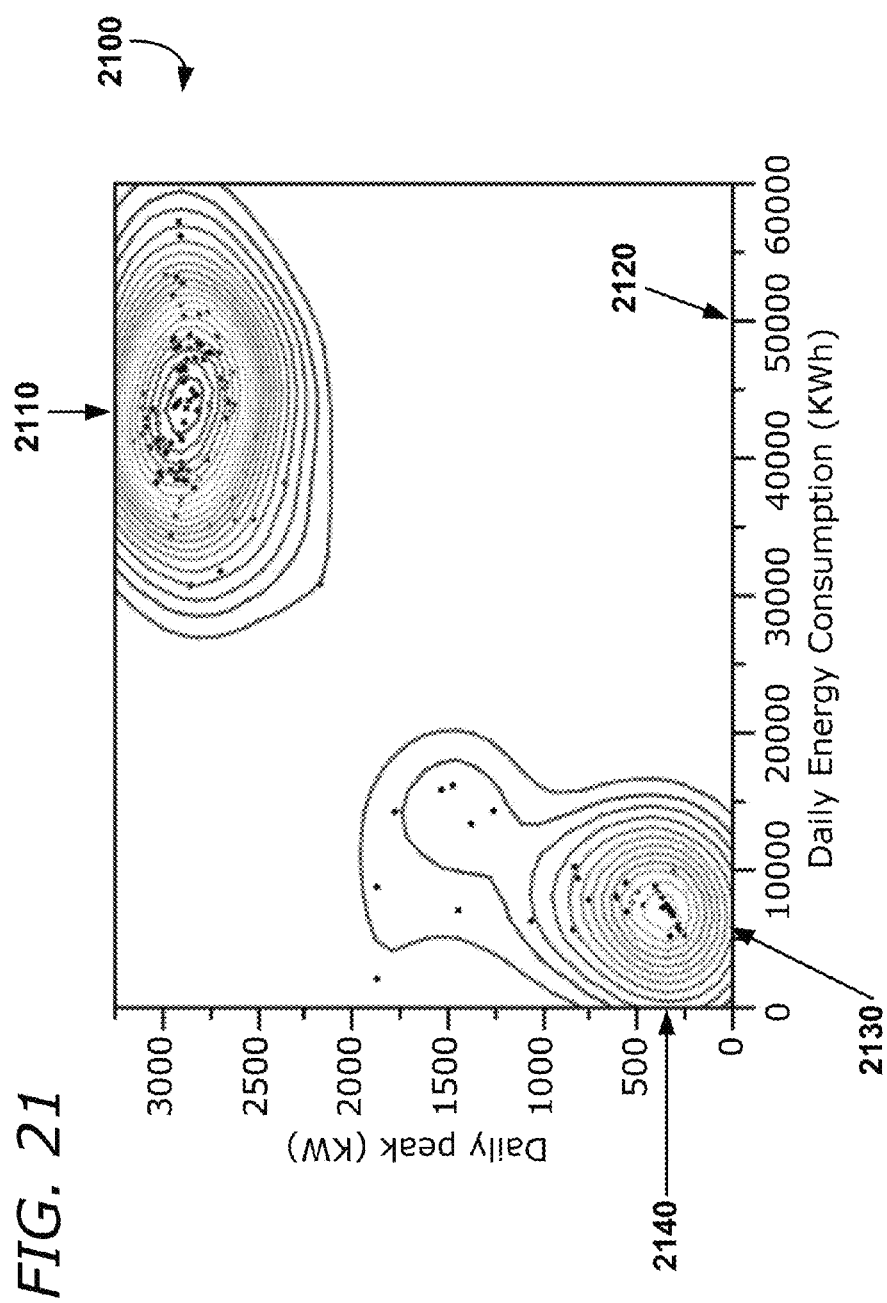
FIG. 21 illustrates an example of a plot of daily energy consumption vs. daily peak usage from a manufacturing plant.

FIG. 21 shows a heat map type plot 2100 of daily energy consumption vs. daily peak usage for the measurement period produced using an embodiment of the present disclosure. Examination of the plot leads to an interesting insight --: the highest daily peaks were not reached on the days of highest energy usage. Highest daily peaks above 3,000 KW 2110 were reached at the days when overall consumption was at the level below 50,000 KWh 2120, while at the days when daily usage was above 6,0000 KWh 2130, the peaks 2140 were below 3,000 KW. This leads to closer scrutiny of the higher peak days: if it is not the usage, what is the reason for the peak?

Figure 22:
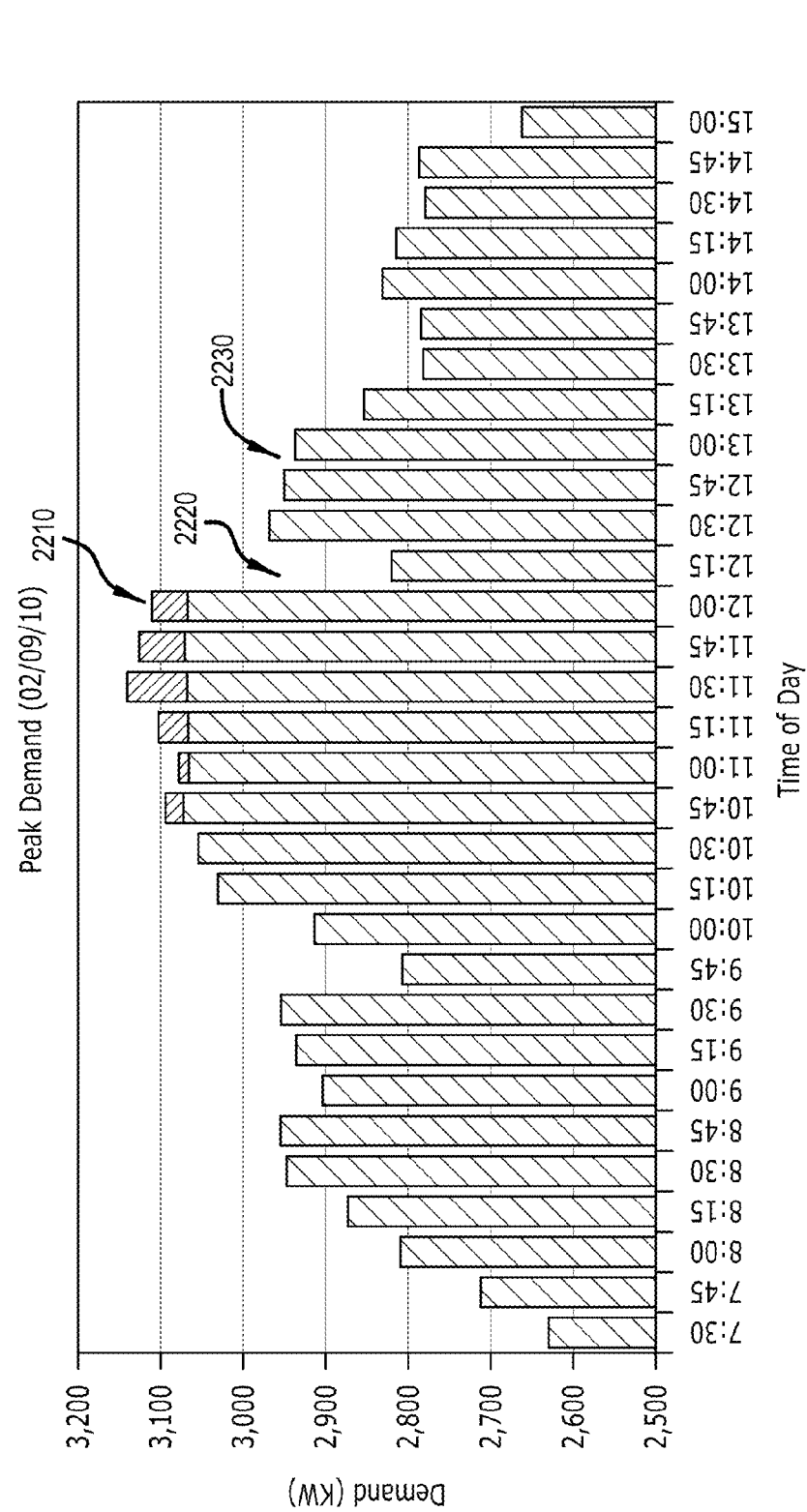
FIG. 22 illustrates an example of a plot of peak demand vs. time of day for a single day at a manufacturing plant.

FIG. 22 shows a bar graph-type plot 2200 of peak demand vs. time of day for a high peak energy usage day produced using an embodiment of the present disclosure. Only the working shift time (7:30 am to 3 pm) is shown. The graph 2200 shows that the highest demand tasks 2210, which cause demand to spike above 3,100 KW, all precede lunch time 2220. Moreover, the activity after lunch 2230 does not resume at the same level as before. By shifting highest demand tasks to the period after lunch, peak demand can be reduced, which can, in some cases, result in lower energy costs (e.g. lower Peak Demand payments).

Figure 23:
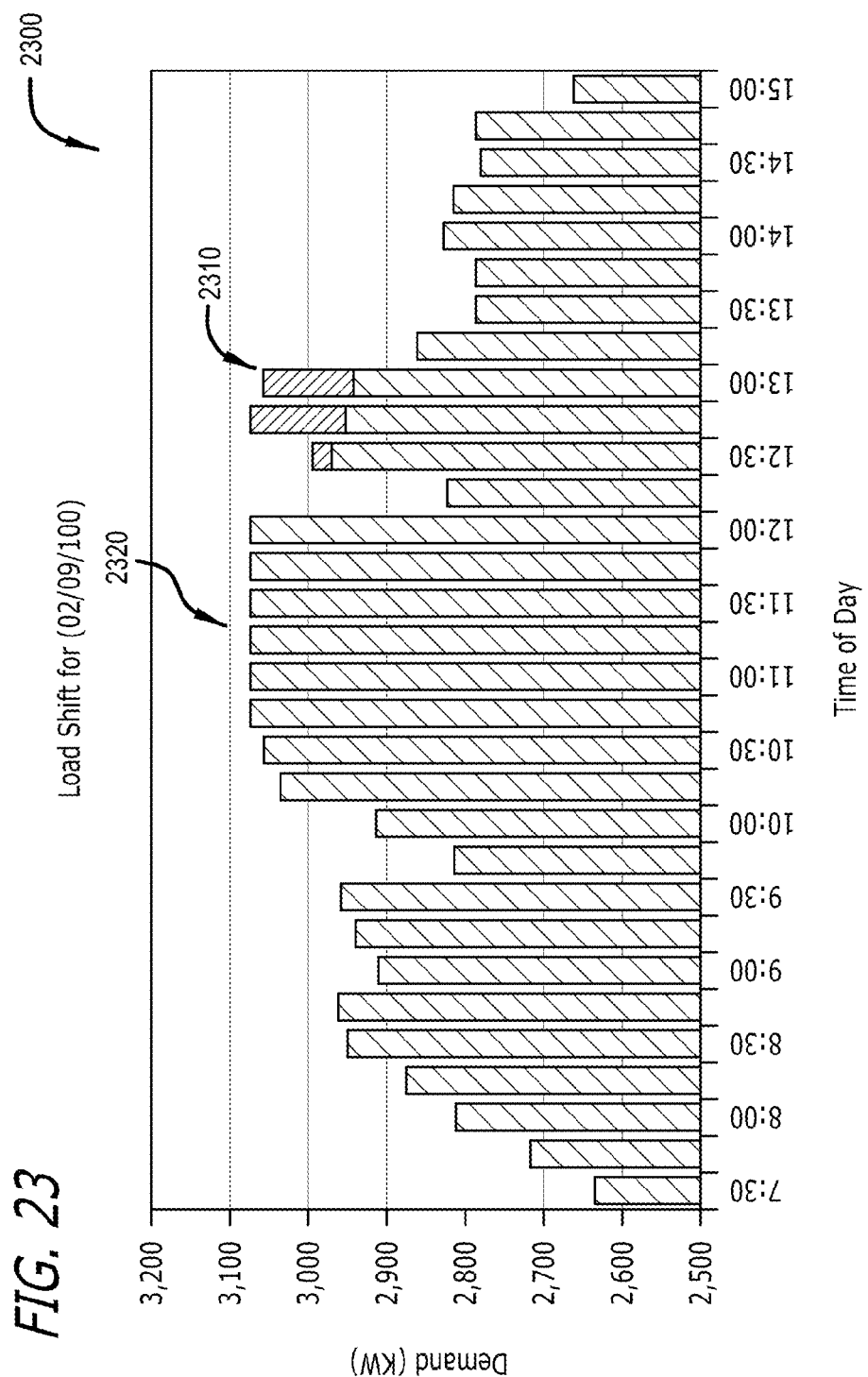
FIG. 23 illustrates an example of a plot of a simulation of peak demand vs. time of day for a single day at a manufacturing plant.

FIG. 23 shows a bar graph plot 2300 of a simulation of peak demand vs. time of day for the highest peak energy usage day produced using an embodiment of the present disclosure. The highest demand tasks 2310 have been shifted from 10:45 AM-12:00 PM to 12:30-1:00 PM. Peak usage times 2320 now all fall below 3,100 KW. This analysis shows that by shifting peak demand tasks (2210 of FIG. 22) to after lunch hours 2310 in this single day, the demand peak will be reduced by 1.54%. Note that while in the case only five month of data were analyzed, in other embodiments, longer periods or shorter periods of time may be analyzed.

FIG. 6, discussed in detail above, utilizes data from this use case to illustrate the impact of strategically shifting capacity over multiple days. Shifting results in 2.5% of savings on peak demand while it will involve tasks that altogether take only 2.5 hours over the entire period. How much of additional gain can be achieved by load shifting of this type? The graph 640 of FIG. 6 demonstrates the benefits of low-impact shifting, that is to say, shifting work within a shift. The horizontal axis represents the number of 15-minute tasks to be shifted (over the whole period of 5 months) and the graph represents the resulting gain in demand peak. This graph 640 demonstrates that shifting about 80 15-min tasks (20 hours over 5 months) will result in peak reductions of about 4.5-4.75%. There are diminishing returns as more and more tasks are shifted. Note that the graph 640 refers to the low impact shifting. Shifting tasks in a more radical fashion (across shifts), the saving will be more significant.

Figure 24:
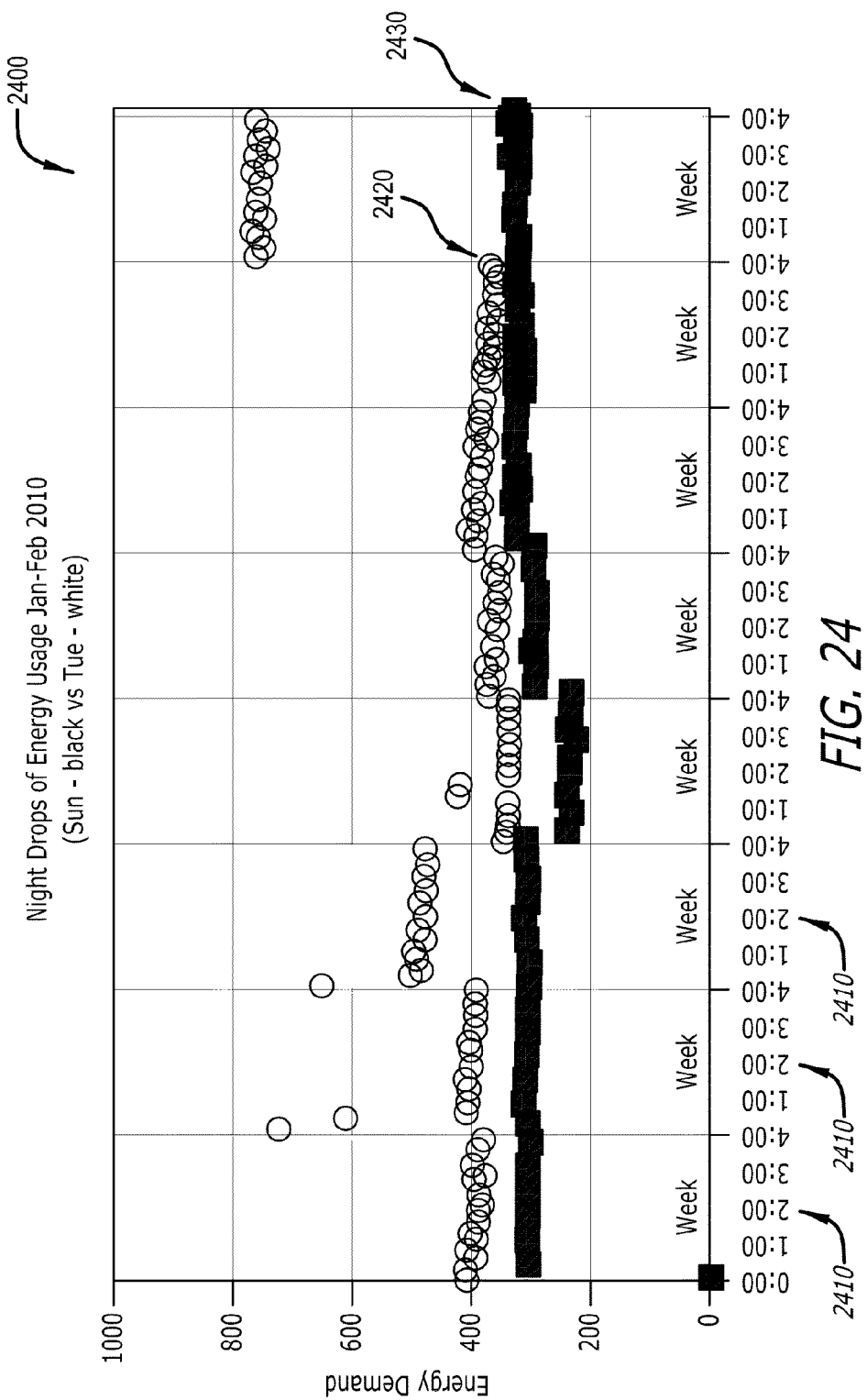
FIG. 24 illustrates an example of a plot of energy demand from 1:00 AM-4:00 AM over multiple weeks at a manufacturing plant.

FIG. 24 shows a plot 2400 of energy demand from 1:00 AM-4:00 AM over multiple weeks 2410, comparing Sundays 2430 with Tuesdays 2420, produced using an embodiment of the present disclosure. It is readily apparent that Tuesday nights 2420, which are idle, consume significantly more energy than weekend nights 2430. Such patterns can sometimes result from legitimate reasons, such as, repairs and tests, however, in this case, the systematic nature of the effect points suggests the possibility of runaway tasks or equipment that is not properly turned off.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
 receiving, by a computing device, data corresponding to energy consumption for a time period;
 receiving, by the computing device, data corresponding to at least one factor that affects energy consumption for the time period, wherein the data corresponding to at least one factor that affects energy consumption includes at least one of production levels, working shifts, idle time, and repair periods;
 analyzing, by the computing device, a combined distribution of the data corresponding to energy consumption and the data corresponding to at least one factor that affects energy consumption;
 identifying, by the computing device, an outlier in the combined distribution; and
 generating, by the computing device, a representation of the outlier in the combined distribution,
 wherein the outlier is identified using a K-nearest neighbor technique.

2. The method of claim 1 further comprising:
 identifying, by the computing device, clusters in the combined distribution;
 building, by the computing device, a model of previously established patterns of energy consumption based on the clusters;
 receiving, by the computing device, data corresponding to energy consumption for a second time period;
 receiving, by the computing device, data corresponding to the at least one factor that affects energy consumption for the second time period;
 determining, by the computing device, that at least a portion of at least one of the data corresponding to energy consumption for the second time period and the data corresponding to the at least one factor that affects energy consumption for the second time period deviates from the previously established patterns of energy consumption; and
 generating, by the computing device, a representation of the at least a portion of the data corresponding to energy consumption for the second time period.

3. The method of claim 2 wherein the clusters are identified using density estimations.

4. The method of claim 2 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

5. The method of claim 2 wherein the at least a portion of the data corresponding to energy consumption for the second time period that deviates from the previously established patterns of energy consumption represents a production inefficiency.

6. The method of claim 2 wherein the at least a portion of the data corresponding to energy consumption for the second time period that deviates from the previously established patterns of energy consumption represents a malfunction in equipment.

7. The method of claim 2 wherein the at least a portion of the data corresponding to energy consumption for the second time period that deviates from the previously established patterns of energy consumption represents outdated equipment.

8. The method of claim 2 wherein the steps are practiced sequentially.

9. The method of claim 2 wherein the clusters are identified using methods of K-nearest neighbor estimation.

10. The method of claim 2 wherein the data corresponding to energy consumption for the time period represents data relating to a first set of equipment and the data corresponding to energy consumption in the second time period represents data relating to a second set of equipment.

11. The method of claim 2 further comprising:
building a demand model of energy consumption per cluster;
forecasting energy consumption for a third time period using the demand model; and
generating a representation of the forecasted energy consumption for the third time period.

12. The method of claim 3 wherein the density estimations include non-parametric kernel density estimation.

13. The method of claim 1 wherein the at least one factor that affects energy consumption for the time period includes at least one of ambient temperature weekends, holidays, seasons, and heating degree days.

14. The method of claim 1 wherein the outlier is further identified using at least one of regression analysis, density estimates, and proximity metrics.

15. A method comprising:
receiving, by a computing device, data corresponding to energy consumption for a time period;
receiving, by the computing device, data corresponding to at least one factor that affects energy consumption for the time period, wherein the at least one factor that affects energy consumption includes at least one of production levels, working shifts, idle time, and repair periods;
analyzing, by the computing device, a combined distribution of the data corresponding to energy consumption and the data corresponding to at least one factor that affects energy consumption;
identifying, by the computing device, an outlier in the combined distribution;
generating, by the computing device, a representation of the outlier in the combined distribution;
identifying, by the computing device, clusters in the combined distribution;
building, by the computing device, a model of previously established patterns of energy consumption based on the clusters;
receiving, by the computing device, data corresponding to energy consumption for a second time period;
receiving, by the computing device, data corresponding to at least one factor that affects energy consumption for the second time period;
determining, by the computing device, that at least a portion of at least one of the data corresponding to energy consumption for the second time period and the data corresponding to the at least one factor that affects energy consumption for the second time period deviates from the previously established patterns of energy consumption; and
generating, by the computing device, a representation of the at least a portion of the data corresponding to energy consumption for the second time period,
wherein the clusters are identified using density estimations and wherein the density estimations include non-parametric kernel density estimation.

16. The method of claim 15 wherein the at least one factor that affects energy consumption for the time period includes at least one of ambient temperature, weekends, holidays, seasons, and heating degree days.

17. The method of claim 15 wherein the outlier is identified using at least one of regression analysis, density estimates, proximity metrics, and a K-nearest neighbor technique.

18. The method of claim 15 wherein the clusters are identified using methods of K-nearest neighbor estimation.

19. The method of claim 15 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

20. The method of claim 15 wherein the data corresponding to energy consumption for the time period represents data relating to a first set of equipment and the data corresponding to energy consumption for the second time period represents data relating to a second set of equipment.

21. The method of claim 15 wherein the at least a portion of the data corresponding to energy consumption for the second time period that deviates from the previously established patterns of energy consumption represents a production inefficiency.

22. The method of claim 15 wherein the at least a portion of the data corresponding to energy consumption for the second time period that deviates from the previously established patterns of energy consumption represents a malfunction in equipment.

23. The method of claim 15 wherein the at least a portion of the data corresponding to energy consumption for the second time period that deviates from the previously established patterns of energy consumption represents outdated equipment.

24. The method of claim 15 wherein the steps are practiced sequentially.

25. The method of claim 15 further comprising:
identifying a plurality of clusters in the combined distribution;
building a demand model of energy consumption per cluster;
forecasting energy consumption for a third time period using the demand model; and
generating a representation of the forecasted energy consumption for the third time period.

26. A method comprising:
receiving, by a computing device, data corresponding to energy consumption for a time period;
receiving, by the computing device, data corresponding to at least one factor that affects energy consumption for the time period, wherein the at least one factor that affects energy consumption includes at least one of production levels, working shifts, idle time, and repair periods;
analyzing, by the computing device, a combined distribution of the data corresponding to energy consumption and the data corresponding to at least one factor that affects energy consumption;
identifying, by the computing device, an outlier in the combined distribution;
generating, by the computing device, a representation of the outlier in the combined distribution;
identifying, by the computing device, clusters in the combined distribution;
building, by the computing device, a model of previously established patterns of energy consumption based on the clusters;
receiving, by the computing device, data corresponding to energy consumption for a second time period;
receiving, by the computing device, data corresponding to at least one factor that affects energy consumption for the second time period;
determining, by the computing device, that at least a portion of at least one of the data corresponding to energy consumption for the second time period and the data corresponding to the at least one factor that affects energy consumption for the second time period deviates from the previously established patterns of energy consumption; and generating, by the computing device, a representation of the at least a portion of the data corresponding to energy consumption for the second time period, wherein the clusters are identified using methods of K-nearest neighbor estimation.

27. The method of claim 26 wherein the at least one factor that affects energy consumption for the time period includes at least one of ambient temperature, weekends, holidays, seasons, and heating degree days.

28. The method of claim 26 wherein the outlier is identified using at least one of regression analysis, density estimates, proximity metrics, and a K-nearest neighbor technique.

29. The method of claim 26 wherein the clusters are identified using density estimations.

30. The method of claim 26 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

31. The method of claim 26 wherein the data corresponding to energy consumption for the time period represents data relating to a first set of equipment and the data corresponding to energy consumption for the second time period represents data relating to a second set of equipment.

32. The method of claim 26 wherein the at least a portion of the data corresponding to energy consumption for the second time period that deviates from the previously established patterns of energy consumption represents a production inefficiency.

33. The method of claim 26 wherein the at least a portion of the data corresponding to energy consumption for the second time period that deviates from the previously established patterns of energy consumption represents a malfunction in equipment.

34. The method of claim 26 wherein the at least a portion of the data corresponding to energy consumption for the second time period that deviates from the previously established patterns of energy consumption represents outdated equipment.

35. The method of claim 26 wherein the steps are practiced sequentially.

36. The method of claim 26 further comprising:
identifying a plurality of clusters in the combined distribution;
building a demand model of energy consumption per cluster;
forecasting energy consumption for a third time period using the demand model; and
generating a representation of the forecasted energy consumption for the third time period.

37. A method comprising:
receiving, by a computing device, data corresponding to energy consumption for a time period;
receiving, by the computing device, data corresponding to at least one factor that affects energy consumption for the time period, wherein the data corresponding to at least one factor that affects energy consumption includes at least one of production levels, working shifts, idle time, and repair periods;
analyzing, by the computing device, a combined distribution of the data corresponding to energy consumption and the data corresponding to at least one factor that affects energy consumption;
identifying, by the computing device, an outlier in the combined distribution;
generating, by the computing device, a representation of the outlier in the combined distribution;
identifying, by the computing device, clusters in the combined distribution;
building, by the computing device, a model of previously established patterns of energy consumption based on the clusters;
receiving, by the computing device, data corresponding to energy consumption for a second time period;
receiving, by the computing device, data corresponding to at least one factor that affects energy consumption for the second time period;
determining, by the computing device, that at least a portion of at least one of the data corresponding to energy consumption for the second time period and the data corresponding to the at least one factor that affects energy consumption for the second time period deviates from the previously established patterns of energy consumption; and
generating, by the computing device, a representation of the at least a portion of the data corresponding to energy consumption for the second time period,
wherein the data corresponding to energy consumption for the time period represents data relating to a first set of equipment and the data corresponding to energy consumption for the second time period represents data relating to a second set of equipment.

38. The method of claim 37 wherein the at least one factor that affects energy consumption for the time period includes at least one of ambient temperature, weekends, holidays, seasons, and heating degree days.

39. The method of claim 37 wherein the outlier is identified using at least one of regression analysis, density estimates, proximity metrics, and a K-nearest neighbor technique.

40. The method of claim 37 wherein the clusters are identified using density estimations.

41. The method of claim 37 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

42. The method of claim 37 wherein the at least a portion of the data corresponding to energy consumption for the second time period that deviates from the previously established patterns of energy consumption represents a production inefficiency.

43. The method of claim 37 wherein the at least a portion of the data corresponding to energy consumption for the second time period that deviates from the previously established patterns of energy consumption represents a malfunction in equipment.

44. The method of claim 37 wherein the at least a portion of the data corresponding to energy consumption for the second time period that deviates from the previously established patterns of energy consumption represents outdated equipment.

45. The method of claim 37 wherein the steps are practiced sequentially.

46. The method of claim 37 further comprising:
identifying a plurality of clusters in the combined distribution;
building a demand model of energy consumption per cluster;
forecasting energy consumption for a third time period using the demand model; and
generating a representation of the forecasted energy consumption for the third time period.

47. A method comprising:
receiving, by a computing device, data corresponding to energy consumption for a time period;
receiving, by the computing device, data corresponding to at least one factor that affects energy consumption for the time period, wherein the data corresponding to at least one factor that affects energy consumption includes at least one of production levels, working shifts, idle time, and repair periods;
analyzing, by the computing device, a combined distribution of the data corresponding to energy consumption and the data corresponding to at least one factor that affects energy consumption;
identifying, by the computing device, an outlier in the combined distribution;
generating, by the computing device, a representation of the outlier in the combined distribution;
identifying, by the computing device, clusters in the combined distribution;
building, by the computing device, a model of previously established patterns of energy consumption based on the clusters;
receiving, by the computing device, data corresponding to energy consumption for a second time period;
receiving, by the computing device, data corresponding to at least one factor that affects energy consumption for the second time period;
determining, by the computing device, that at least a portion of at least one of the data corresponding to energy consumption for the second time period and the data corresponding to the at least one factor that affects energy consumption for the second time period deviates from the previously established patterns of energy consumption;
generating, by the computing device, a representation of the at least a portion of the data corresponding to energy consumption for the second time period;
building, by the computing device, a demand model of energy consumption per cluster;
forecasting, by the computing device, energy consumption for a third time period using the demand model; and
generating, by the computing device, a representation of the forecasted energy consumption for the third time period.

48. The method of claim 47 wherein the at least one factor that affects energy consumption for the time period includes at least one of ambient temperature, weekends, holidays, seasons, and heating degree days.

49. The method of claim 47 wherein the outlier is identified using at least one of regression analysis, density estimates, proximity metrics, and a K-nearest neighbor technique.

50. The method of claim 47 wherein the clusters are identified using density estimations.

51. The method of claim 47 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

52. The method of claim 47 wherein the at least a portion of the data corresponding to energy consumption for the second time period that deviates from the previously established patterns of energy consumption represents a production inefficiency.

53. The method of claim 47 wherein the at least a portion of the data corresponding to energy consumption for the second time period that deviates from the previously established patterns of energy consumption represents a malfunction in equipment.

54. The method of claim 47 wherein the at least a portion of the data corresponding to energy consumption for the second time period that deviates from the previously established patterns of energy consumption represents outdated equipment.

55. The method of claim 47 wherein the steps are practiced sequentially.

56. A system comprising:
at least one processor; and
a memory storing instructions configured to instruct the at least one processor to perform:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution; and
generating a representation of the outlier in the combined distribution,
wherein the outlier is identified using a K-nearest neighbor technique.

57. The system of claim 56 further comprising:
identifying clusters in the combined distribution;
building a model of previously established patterns of energy consumption based on the clusters;
receiving data corresponding to energy consumption for a second time period;
receiving data corresponding to the at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period.

58. The system of claim 57 wherein the clusters are identified using density estimations.

59. The system of claim 58 wherein the density estimations include non-parametric kernel density estimation.

60. The system of claim 57 wherein the clusters are identified using methods of K-nearest neighbor estimation.

61. The system of claim 57 wherein the data corresponding to energy consumption for the time period represents data relating to a first set of equipment and the data corresponding to energy consumption in the second time period represents data relating to a second set of equipment.

62. The system of claim 57 further comprising:
building a demand model of energy consumption per cluster;
forecasting energy consumption for a third time period using the demand model; and
generating a representation of the forecasted energy consumption for the third time period.

63. The system of claim 57 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

64. The system of claim 57 wherein the at least a portion of the data corresponding to energy consumption for the second time period that deviates from the previously established patterns of energy consumption represents a production inefficiency.

65. The system of claim 57 wherein the at least a portion of the data corresponding to energy consumption for the second time period that deviates from the previously established patterns of energy consumption represents a malfunction in equipment.

66. The system of claim 57 wherein the at least a portion of the data corresponding to energy consumption for the second time period that deviates from the previously established patterns of energy consumption represents outdated equipment.

67. The system of claim 57 wherein the steps are practiced sequentially.

68. The system of claim 56 wherein the at least one factor that affects energy consumption for the time period includes at least one of ambient temperature, production levels, working shifts, idle time, weekends, holidays, repair periods, seasons, weather and heating degree days.

69. The system of claim 56 wherein the outlier is further identified using at least one of regression analysis, density estimates, and proximity metrics.

70. A system comprising:
at least one processor; and
a memory storing instructions configured to instruct the at least one processor to perform:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution;
generating a representation of the outlier in the combined distribution;
identifying clusters in the combined distribution;
building a model of previously established patterns of energy consumption based on the clusters;
receiving data corresponding to energy consumption for a second time period;
receiving data corresponding to at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period,
wherein the clusters are identified using density estimations and wherein the density estimations include non-parametric kernel density estimation.

71. The system of claim 70 wherein the at least one factor that affects energy consumption for the time period includes at least one of ambient temperature, production levels, working shifts, idle time, weekends, holidays, repair periods, seasons, weather and heating degree days.

72. The system of claim 70 wherein the outlier is identified using at least one of regression analysis, density estimates, proximity metrics, and a K-nearest neighbor technique.

73. The system of claim 70 wherein the clusters are identified using methods of K-nearest neighbor estimation.

74. The system of claim 70 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

75. The system of claim 70 wherein the data corresponding to energy consumption for the time period represents data relating to a first set of equipment and the data corresponding to energy consumption for the second time period represents data relating to a second set of equipment.

76. The system of claim 70 wherein the at least a portion of the data corresponding to energy consumption for the second time period that deviates from the previously established patterns of energy consumption represents a production inefficiency.

77. The system of claim 70 wherein the at least a portion of the data corresponding to energy consumption for the second time period that deviates from the previously established patterns of energy consumption represents a malfunction in equipment.

78. The system of claim 70 wherein the at least a portion of the data corresponding to energy consumption for the second time period that deviates from the previously established patterns of energy consumption represents outdated equipment.

79. The system of claim 70 wherein the steps are practiced sequentially.

80. The system of claim 70 further comprising:
identifying a plurality of clusters in the combined distribution;
building a demand model of energy consumption per cluster;

forecasting energy consumption for a third time period using the demand model; and generating a representation of the forecasted energy consumption for the third time period.

81. A system comprising:
at least one processor; and
a memory storing instructions configured to instruct the at least one processor to perform:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution;
generating a representation of the outlier in the combined distribution;
identifying clusters in the combined distribution;
building a model of previously established patterns of energy consumption based on the clusters;
receiving data corresponding to energy consumption for a second time period;
receiving data corresponding to at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period,
wherein the clusters are identified using methods of K-nearest neighbor estimation.

82. The system of claim 81 wherein the at least one factor that affects energy consumption for the time period includes at least one of ambient temperature, production levels, working shifts, idle time, weekends, holidays, repair periods, seasons, weather and heating degree days.

83. The system of claim 81 wherein the outlier is identified using at least one of regression analysis, density estimates, proximity metrics, and a K-nearest neighbor technique.

84. The system of claim 81 wherein the clusters are identified using density estimations.

85. The system of claim 81 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

86. The system of claim 81 wherein the data corresponding to energy consumption for the time period represents data relating to a first set of equipment and the data corresponding to energy consumption for the second time period represents data relating to a second set of equipment.

87. The system of claim 81 wherein the at least a portion of the data corresponding to energy consumption for the second time period that deviates from the previously established patterns of energy consumption represents a production inefficiency.

88. The system of claim 81 wherein the at least a portion of the data corresponding to energy consumption for the second time period that deviates from the previously established patterns of energy consumption represents a malfunction in equipment.

89. The system of claim 81 wherein the at least a portion of the data corresponding to energy consumption for the second time period that deviates from the previously established patterns of energy consumption represents outdated equipment.

90. The system of claim 81 wherein the steps are practiced sequentially.

91. The system of claim 81 further comprising:
identifying a plurality of clusters in the combined distribution;
building a demand model of energy consumption per cluster;
forecasting energy consumption for a third time period using the demand model; and
generating a representation of the forecasted energy consumption for the third time period.

92. A system comprising:
at least one processor; and
a memory storing instructions configured to instruct the at least one processor to perform:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution;
generating a representation of the outlier in the combined distribution;
identifying clusters in the combined distribution;
building a model of previously established patterns of energy consumption based on the clusters;
receiving data corresponding to energy consumption for a second time period;
receiving data corresponding to at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period,
wherein the data corresponding to energy consumption for the time period represents data relating to a first set of equipment and the data corresponding to energy consumption for the second time period represents data relating to a second set of equipment.

93. The system of claim 92 wherein the at least one factor that affects energy consumption for the time period includes at least one of ambient temperature, production levels, working shifts, idle time, weekends, holidays, repair periods, seasons, weather and heating degree days.

94. The system of claim 92 wherein the outlier is identified using at least one of regression analysis, density estimates, proximity metrics, and a K-nearest neighbor technique.

95. The system of claim 92 wherein the clusters are identified using density estimations.

96. The system of claim 92 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

97. The system of claim 92 wherein the at least a portion of the data corresponding to energy consumption for the second time period that deviates from the previously established patterns of energy consumption represents a production inefficiency.

98. The system of claim 92 wherein the at least a portion of the data corresponding to energy consumption for the second time period that deviates from the previously established patterns of energy consumption represents a malfunction in equipment.

99. The system of claim 92 wherein the at least a portion of the data corresponding to energy consumption for the second time period that deviates from the previously established patterns of energy consumption represents outdated equipment.

100. The system of claim 92 wherein the steps are practiced sequentially.

101. The system of claim 92 further comprising:
identifying a plurality of clusters in the combined distribution;
building a demand model of energy consumption per cluster;
forecasting energy consumption for a third time period using the demand model; and
generating a representation of the forecasted energy consumption for the third time period.

102. A system comprising:
at least one processor; and
a memory storing instructions configured to instruct the at least one processor to perform:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution;
generating a representation of the outlier in the combined distribution;
identifying clusters in the combined distribution;
building a model of previously established patterns of energy consumption based on the clusters;
receiving data corresponding to energy consumption for a second time period;
receiving data corresponding to at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption;
generating a representation of the at least a portion of the data corresponding to energy consumption for the second time period;
building a demand model of energy consumption per cluster;
forecasting energy consumption for a third time period using the demand model; and generating a representation of the forecasted energy consumption for the third time period.

103. The system of claim 102 wherein the at least one factor that affects energy consumption for the time period includes at least one of ambient temperature, production levels, working shifts, idle time, weekends, holidays, repair periods, seasons, weather and heating degree days.

104. The system of claim 102 wherein the outlier is identified using at least one of regression analysis, density estimates, proximity metrics, and a K-nearest neighbor technique.

105. The system of claim 102 wherein the clusters are identified using density estimations.

106. The system of claim 102 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

107. The system of claim 102 wherein the at least a portion of the data corresponding to energy consumption for the second time period that deviates from the previously established patterns of energy consumption represents a production inefficiency.

108. The system of claim 102 wherein the at least a portion of the data corresponding to energy consumption for the second time period that deviates from the previously established patterns of energy consumption represents a malfunction in equipment.

109. The system of claim 102 wherein the at least a portion of the data corresponding to energy consumption for the second time period that deviates from the previously established patterns of energy consumption represents outdated equipment.

110. The system of claim 102 wherein the steps are practiced sequentially.

111. A non-transitory computer storage medium storing computer executable instructions that, when executed, cause a computer system to perform a computer implemented method comprising:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution; and
generating a representation of the outlier in the combined distribution, wherein the outlier is identified using a K-nearest neighbor technique.

112. The non-transitory computer storage medium of claim 111 further comprising:
identifying clusters in the combined distribution;
building a model of previously established patterns of energy consumption based on the clusters;
receiving data corresponding to energy consumption for a second time period;
receiving data corresponding to the at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period.

113. The non-transitory computer storage medium of claim 112 wherein the clusters are identified using density estimations.

114. The non-transitory computer storage medium of claim 113 wherein the density estimations include non-parametric kernel density estimation.

115. The non-transitory computer storage medium of claim 112 wherein the clusters are identified using methods of K-nearest neighbor estimation.

116. The non-transitory computer storage medium of claim 112 wherein the data corresponding to energy consumption for the time period represents data relating to a first set of equipment and the data corresponding to energy consumption in the second time period represents data relating to a second set of equipment.

117. The non-transitory computer storage medium of claim 112 further comprising:
building a demand model of energy consumption per cluster;
forecasting energy consumption for a third time period using the demand model; and
generating a representation of the forecasted energy consumption for the third time period.

118. The non-transitory computer storage medium of claim 112 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

119. The non-transitory computer storage medium of claim 112 wherein the at least a portion of the data corresponding to energy consumption for the second time period that deviates from the previously established patterns of energy consumption represents a production inefficiency.

120. The non-transitory computer storage medium of claim 112 wherein the at least a portion of the data corresponding to energy consumption for the second time period that deviates from the previously established patterns of energy consumption represents a malfunction in equipment.

121. The non-transitory computer storage medium of claim 112 wherein the at least a portion of the data corresponding to energy consumption for the second time period that deviates from the previously established patterns of energy consumption represents outdated equipment.

122. The non-transitory computer storage medium of claim 112 wherein the steps are practiced sequentially.

123. The non-transitory computer storage medium of claim 111 wherein the at least one factor that affects energy consumption for the time period includes at least one of ambient temperature, production levels, working shifts, idle time, weekends, holidays, repair periods, seasons, weather and heating degree days.

124. The non-transitory computer storage medium of claim 111 wherein the outlier is further identified using at least one of regression analysis, density estimates, and proximity metrics.

125. A non-transitory computer storage medium storing computer executable instructions that, when executed, cause a computer system to perform a computer implemented method comprising:
receiving data corresponding to energy consumption for a time period;
receiving data corresponding to at least one factor that affects energy consumption for the time period, wherein the data corresponding to at least one factor that affects energy consumption includes at least one of production levels, working shifts, idle time, and repair periods;
analyzing a combined distribution of the data corresponding to energy consumption and the data corresponding to at least one factor that affects energy consumption;
identifying an outlier in the combined distribution;
generating a representation of the outlier in the combined distribution;
identifying clusters in the combined distribution;
building a model of previously established patterns of energy consumption based on the clusters;
receiving data corresponding to energy consumption for a second time period;
receiving data corresponding to at least one factor that affects energy consumption for the second time period;
determining that at least a portion of at least one of the data corresponding to energy consumption for the second time period and the data corresponding to the at least one factor that affects energy consumption for the second time period deviates from the previously established patterns of energy consumption; and
generating a representation of the at least a portion of the data corresponding to energy consumption for the second time period,
wherein the clusters are identified using density estimations and wherein the density estimations include non-parametric kernel density estimation.

126. The non-transitory computer storage medium of claim 125 wherein the at least one factor that affects energy consumption for the time period includes at least one of ambient temperature, production levels, working shifts, idle time, weekends, holidays, repair periods, seasons, weather and heating degree days.

127. The non-transitory computer storage medium of claim 125 wherein the outlier is identified using at least one of regression analysis, density estimates, proximity metrics, and a K-nearest neighbor technique.

128. The non-transitory computer storage medium of claim 125 wherein the clusters are identified using methods of K-nearest neighbor estimation.

129. The non-transitory computer storage medium of claim 125 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

130. The non-transitory computer storage medium of claim 125 wherein the data corresponding to energy consumption for the time period represents data relating to a first set of equipment and the data corresponding to energy consumption for the second time period represents data relating to a second set of equipment.

131. The non-transitory computer storage medium of claim 125 wherein the at least a portion of the data corresponding to energy consumption for the second time period that deviates from the previously established patterns of energy consumption represents a production inefficiency.

132. The non-transitory computer storage medium of claim 125 wherein the at least a portion of the data corresponding to energy consumption for the second time period that deviates from the previously established patterns of energy consumption represents a malfunction in equipment.

133. The non-transitory computer storage medium of claim 125 wherein the at least a portion of the data corresponding to energy consumption for the second time period that deviates from the previously established patterns of energy consumption represents outdated equipment.

134. The non-transitory computer storage medium of claim 125 wherein the steps are practiced sequentially.

135. The system of claim 125 further comprising:
   identifying a plurality of clusters in the combined distribution;
   building a demand model of energy consumption per cluster;
   forecasting energy consumption for a third time period using the demand model; and generating a representation of the forecasted energy consumption for the third time period.

136. A non-transitory computer storage medium storing computer executable instructions that, when executed, cause a computer system to perform a computer implemented method comprising:
   receiving data corresponding to energy consumption for a time period;
   receiving data corresponding to at least one factor that affects energy consumption for the time period, wherein the data corresponding to at least one factor that affects energy consumption includes at least one of production levels, working shifts, idle time, and repair periods;
   analyzing a combined distribution of the data corresponding to energy consumption and the data corresponding to at least one factor that affects energy consumption;
   identifying an outlier in the combined distribution;
   generating a representation of the outlier in the combined distribution;
   identifying clusters in the combined distribution;
   building a model of previously established patterns of energy consumption based on the clusters;
   receiving data corresponding to energy consumption for a second time period;
   receiving data corresponding to at least one factor that affects energy consumption for the second time period;
   determining that at least a portion of at least one of the data corresponding to energy consumption for the second time period and the data corresponding to the at least one factor that affects energy consumption for the second time period deviates from the previously established patterns of energy consumption; and
   generating a representation of the at least a portion of the data corresponding to energy consumption for the second time period,
   wherein the clusters are identified using methods of K-nearest neighbor estimation.

137. The non-transitory computer storage medium of claim 136 wherein the at least one factor that affects energy consumption for the time period includes at least one of ambient temperature, production levels, working shifts, idle time, weekends, holidays, repair periods, seasons, weather and heating degree days.

138. The non-transitory computer storage medium of claim 136 wherein the outlier is identified using at least one of regression analysis, density estimates, proximity metrics, and a K-nearest neighbor technique.

139. The non-transitory computer storage medium of claim 136 wherein the clusters are identified using density estimations.

140. The non-transitory computer storage medium of claim 136 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

141. The non-transitory computer storage medium of claim 136 wherein the data corresponding to energy consumption for the time period represents data relating to a first set of equipment and the data corresponding to energy consumption for the second time period represents data relating to a second set of equipment.

142. The non-transitory computer storage medium of claim 136 wherein the at least a portion of the data corresponding to energy consumption for the second time period that deviates from the previously established patterns of energy consumption represents a production inefficiency.

143. The non-transitory computer storage medium of claim 136 wherein the at least a portion of the data corresponding to energy consumption for the second time period that deviates from the previously established patterns of energy consumption represents a malfunction in equipment.

144. The non-transitory computer storage medium of claim 136 wherein the at least a portion of the data corresponding to energy consumption for the second time period that deviates from the previously established patterns of energy consumption represents outdated equipment.

145. The non-transitory computer storage medium of claim 136 wherein the steps are practiced sequentially.

146. The non-transitory computer storage medium of claim 136 further comprising:
   identifying a plurality of clusters in the combined distribution;
   building a demand model of energy consumption per cluster;
   forecasting energy consumption for a third time period using the demand model; and
   generating a representation of the forecasted energy consumption for the third time period.

147. A non-transitory computer storage medium storing computer executable instructions that, when executed, cause a computer system to perform a computer implemented method comprising:
   receiving data corresponding to energy consumption for a time period;

receiving data corresponding to at least one factor that affects energy consumption for the time period, wherein the data corresponding to at least one factor that affects energy consumption includes at least one of production levels, working shifts, idle time, and repair periods;

analyzing a combined distribution of the data corresponding to energy consumption and the data corresponding to at least one factor that affects energy consumption;

identifying an outlier in the combined distribution;

generating a representation of the outlier in the combined distribution;

identifying clusters in the combined distribution;

building a model of previously established patterns of energy consumption based on the clusters;

receiving data corresponding to energy consumption for a second time period;

receiving data corresponding to at least one factor that affects energy consumption for the second time period;

determining that at least a portion of at least one of the data corresponding to energy consumption for the second time period and the data corresponding to the at least one factor that affects energy consumption for the second time period deviates from the previously established patterns of energy consumption; and generating a representation of the at least a portion of the data corresponding to energy consumption for the second time period, wherein the data corresponding to energy consumption for the time period represents data relating to a first set of equipment and the data corresponding to energy consumption for the second time period represents data relating to a second set of equipment.

148. The non-transitory computer storage medium of claim 147 wherein the at least one factor that affects energy consumption for the time period includes at least one of ambient temperature, production levels, working shifts, idle time, weekends, holidays, repair periods, seasons, weather and heating degree days.

149. The non-transitory computer storage medium of claim 147 wherein the outlier is identified using at least one of regression analysis, density estimates, proximity metrics, and a K-nearest neighbor technique.

150. The non-transitory computer storage medium of claim 147 wherein the clusters are identified using density estimations.

151. The non-transitory computer storage medium of claim 147 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

152. The non-transitory computer storage medium of claim 147 wherein the at least a portion of the data corresponding to energy consumption for the second time period that deviates from the previously established patterns of energy consumption represents a production inefficiency.

153. The non-transitory computer storage medium of claim 147 wherein the at least a portion of the data corresponding to energy consumption for the second time period that deviates from the previously established patterns of energy consumption represents a malfunction in equipment.

154. The non-transitory computer storage medium of claim 147 wherein the at least a portion of the data corresponding to energy consumption for the second time period that deviates from the previously established patterns of energy consumption represents outdated equipment.

155. The non-transitory computer storage medium of claim 147 wherein the steps are practiced sequentially.

156. The non-transitory computer storage medium of claim 147 further comprising:

identifying a plurality of clusters in the combined distribution;

building a demand model of energy consumption per cluster;

forecasting energy consumption for a third time period using the demand model; and generating a representation of the forecasted energy consumption for the third time period.

157. A non-transitory computer storage medium storing computer executable instructions that, when executed, cause a computer system to perform a computer implemented method comprising:

receiving data corresponding to energy consumption for a time period;

receiving data corresponding to at least one factor that affects energy consumption for the time period, wherein the data corresponding to at least one factor that affects energy consumption includes at least one of production levels, working shifts, idle time, and repair periods;

analyzing a combined distribution of the data corresponding to energy consumption and the data corresponding to at least one factor that affects energy consumption;

identifying an outlier in the combined distribution;

generating a representation of the outlier in the combined distribution;

identifying clusters in the combined distribution;

building a model of previously established patterns of energy consumption based on the clusters;

receiving data corresponding to energy consumption for a second time period;

receiving data corresponding to at least one factor that affects energy consumption for the second time period;

determining that at least a portion of at least one of the data corresponding to energy consumption for the second time period and the data corresponding to the at least one factor that affects energy consumption for the second time period deviates from the previously established patterns of energy consumption;

generating a representation of the at least a portion of the data corresponding to energy consumption for the second time period;

building a demand model of energy consumption per cluster;

forecasting energy consumption for a third time period using the demand model; and generating a representation of the forecasted energy consumption for the third time period.

158. The non-transitory computer storage medium of claim 157 wherein the at least one factor that affects energy consumption for the time period includes at least one of ambient temperature, production levels, working shifts, idle time, weekends, holidays, repair periods, seasons, weather and heating degree days.

159. The non-transitory computer storage medium of claim 157 wherein the outlier is identified using at least one of regression analysis, density estimates, proximity metrics, and a K-nearest neighbor technique.

160. The non-transitory computer storage medium of claim 157 wherein the clusters are identified using density estimations.

161. The non-transitory computer storage medium of claim 157 wherein the data corresponding to energy consumption for the time period and the data corresponding to the at least one factor that affects energy consumption for the time period represent data relating to a first physical location and the data corresponding to energy consumption for the second time period and the data corresponding to the at least one factor that affects energy consumption for the second time period represent data relating to a second physical location.

162. The non-transitory computer storage medium of claim 157 wherein the at least a portion of the data corresponding to energy consumption for the second time period that deviates from the previously established patterns of energy consumption represents a production inefficiency.

163. The non-transitory computer storage medium of claim 157 wherein the at least a portion of the data corresponding to energy consumption for the second time period that deviates from the previously established patterns of energy consumption represents a malfunction in equipment.

164. The non-transitory computer storage medium of claim 157 wherein the at least a portion of the data corresponding to energy consumption for the second time period that deviates from the previously established patterns of energy consumption represents outdated equipment.

165. The non-transitory computer storage medium of claim 157 wherein the steps are practiced sequentially.

* * * * *